US009633037B2

(12) United States Patent
Smith et al.

(10) Patent No.: US 9,633,037 B2
(45) Date of Patent: Apr. 25, 2017

(54) SYSTEMS AND METHODS FOR SYNCHRONIZATION EVENT BUILDING AND/OR COLLAPSING BY A SYNCHRONIZATION COMPONENT OF A CLOUD-BASED PLATFORM

(71) Applicant: Box, Inc., Los Altos, CA (US)

(72) Inventors: Benjamin Campbell Smith, Mountain View, CA (US); David Mackenzie, Daly City, CA (US); Yiming Lu, Los Altos, CA (US); Kunal Parmar, San Jose, CA (US); Peter Potrebic, Calistoga, CA (US)

(73) Assignee: Box, Inc, Radwood City, CA (US)

( * ) Notice: Subject to any disclaimer, the term of this patent is extended or adjusted under 35 U.S.C. 154(b) by 175 days.

(21) Appl. No.: 14/304,038

(22) Filed: Jun. 13, 2014

(65) Prior Publication Data

US 2014/0372376 A1    Dec. 18, 2014

Related U.S. Application Data

(60) Provisional application No. 61/834,756, filed on Jun. 13, 2013.

(51) Int. Cl.
*G06F 17/30*    (2006.01)
(52) U.S. Cl.
CPC .. *G06F 17/30174* (2013.01); *G06F 17/30578* (2013.01)
(58) Field of Classification Search
USPC .......................................... 707/624, 610, 611
See application file for complete search history.

(56) References Cited

U.S. PATENT DOCUMENTS

| 858,619 A | 7/1907 | O'Farrell |
| 5,043,876 A | 8/1991 | Terry |

(Continued)

FOREIGN PATENT DOCUMENTS

| CA | 2724521 | 11/2009 |
| CN | 101997924 A | 3/2011 |

(Continued)

OTHER PUBLICATIONS

Wei, et al., "Managing Security of Virtual Machine Images in a Cloud Environment," CCSW'09, Nov. 13, 2009, pp. 91-96.

(Continued)

*Primary Examiner* — Cam-Linh Nguyen
(74) *Attorney, Agent, or Firm* — Perkins Coie LLP

(57) ABSTRACT

Techniques for monitoring local and/or remote file systems by a synchronization component (e.g., client/server) of a cloud-based platform are disclosed. In some embodiments, a method of building synchronization events by a synchronization component (e.g., a synchronization server/client) includes obtaining a set of items that have been changed and their new states and retrieving last known states of the set of items that are stored in a reference snapshot inside a file-system scanner. The method further includes generating differences between the new states and the last known states of the set of items as item changes and utilizing information provided by the item changes to translate the item changes into synchronization events for execution on the opposing file system. A method of handling failed synchronization events by a synchronization component of the cloud-based platform by collapsing a subsequent event with the failed synchronization event is also disclosed.

16 Claims, 16 Drawing Sheets

(56) References Cited

U.S. PATENT DOCUMENTS

| | | |
|---|---|---|
| 5,748,735 A | 5/1998 | Ganesan |
| 5,774,717 A | 6/1998 | Porcaro |
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,926,816 A * | 7/1999 | Bauer ............... G06F 17/30578 |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,279,109 B1 | 8/2001 | Brundridge |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,446,091 B1 | 9/2002 | Noren et al. |
| 6,449,622 B1 | 9/2002 | LaRue et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,080,104 B2 | 7/2006 | Ring et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,171,468 B2 | 1/2007 | Yeung et al. |
| 7,178,021 B1 | 2/2007 | Hanna et al. |
| 7,222,078 B2 | 5/2007 | Abelow |
| 7,275,244 B1 | 9/2007 | Bell et al. |
| 7,296,025 B2 | 11/2007 | Kung et al. |
| 7,337,193 B1 | 2/2008 | Mills et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,380,120 B1 | 5/2008 | Garcia |
| 7,386,535 B1 | 6/2008 | Kalucha et al. |
| 7,401,117 B2 | 7/2008 | Dan et al. |
| 7,523,276 B1 * | 4/2009 | Shankar ............... G06F 11/1451 |
| | | 707/999.202 |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,653,668 B1 | 1/2010 | Shelat et al. |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,739,411 B2 | 6/2010 | Messer et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,201,230 B2 | 6/2012 | Day et al. |
| 8,214,747 B1 | 7/2012 | Yankovich et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,447,820 B1 | 5/2013 | Gay |
| 8,464,161 B2 | 6/2013 | Giles et al. |
| 8,473,775 B1 | 6/2013 | Helmick et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,650,498 B1 | 2/2014 | Mihovilovic |
| 8,719,445 B2 | 5/2014 | Ko |
| 8,719,810 B2 | 5/2014 | Oh |
| 8,745,267 B2 | 6/2014 | Luecke et al. |
| 8,782,637 B2 | 7/2014 | Khalid |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,179 B2 | 2/2015 | Besen et al. |
| 8,949,939 B2 | 2/2015 | Peddada |
| 8,955,103 B2 | 2/2015 | Kline, III et al. |
| 8,959,579 B2 | 2/2015 | Barton et al. |
| 8,966,062 B1 | 2/2015 | Giese et al. |
| 8,990,307 B2 | 3/2015 | Barreto et al. |
| 8,990,955 B2 | 3/2015 | Hymel et al. |
| 9,015,248 B2 | 4/2015 | Barreto et al. |
| 9,054,919 B2 | 6/2015 | Kiang et al. |
| 9,239,846 B2 | 1/2016 | Besen et al. |
| 9,244,934 B2 | 1/2016 | Besen et al. |
| 9,396,216 B2 | 7/2016 | Barreto et al. |
| 9,396,245 B2 | 7/2016 | Mackenzie et al. |
| 9,495,364 B2 | 11/2016 | Savage et al. |
| 9,507,795 B2 | 11/2016 | Dorman et al. |
| 9,535,924 B2 | 1/2017 | Mackenzie et al. |
| 2001/0027492 A1 | 10/2001 | Gupta |

(56) References Cited

U.S. PATENT DOCUMENTS

| | | |
|---|---|---|
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0003104 A1 | 1/2004 | Boskovic et al. |
| 2004/0021686 A1 | 2/2004 | Barberis |
| 2004/0076187 A1 | 4/2004 | Peled |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0162836 A1 | 8/2004 | Aronoff et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0230652 A1 | 11/2004 | Estrada et al. |
| 2004/0246532 A1 | 12/2004 | Inada |
| 2004/0260977 A1 | 12/2004 | Ji et al. |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022175 A1 | 1/2005 | Sliger et al. |
| 2005/0022229 A1 | 1/2005 | Gabriel et al. |
| 2005/0028006 A1 | 2/2005 | Leser et al. |
| 2005/0033777 A1 | 2/2005 | Moraes et al. |
| 2005/0038831 A1 | 2/2005 | Souder et al. |
| 2005/0038997 A1 | 2/2005 | Kojima et al. |
| 2005/0050228 A1 | 3/2005 | Perham et al. |
| 2005/0055306 A1 | 3/2005 | Miller et al. |
| 2005/0063083 A1 | 3/2005 | Dart et al. |
| 2005/0097061 A1 | 5/2005 | Shapiro et al. |
| 2005/0097225 A1 | 5/2005 | Glatt et al. |
| 2005/0097434 A1 | 5/2005 | Storisteanu |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0172284 A1 | 8/2005 | Dandekar et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0173952 A1 | 8/2006 | Coyle |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0016680 A1 | 1/2007 | Burd et al. |
| 2007/0028291 A1 | 2/2007 | Brennan et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0179993 A1 | 8/2007 | Arruza |
| 2007/0195779 A1 | 8/2007 | Judge et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |

(56) References Cited

U.S. PATENT DOCUMENTS

| | | |
|---|---|---|
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | Mcdonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082396 A1 | 4/2010 | Caldwell et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205392 A1 | 8/2010 | Schnapp et al. |
| 2010/0205537 A1 | 8/2010 | Knighton et al. |
| 2010/0212010 A1 | 8/2010 | Stringer et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332818 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |

(56) References Cited

U.S. PATENT DOCUMENTS

| | | |
|---|---|---|
| 2011/0246950 A1 | 10/2011 | Luna et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089610 A1 | 4/2012 | Agrawal et al. |
| 2012/0089659 A1 | 4/2012 | Halevi et al. |
| 2012/0089710 A1 | 4/2012 | Rakowski et al. |
| 2012/0096521 A1 | 4/2012 | Peddada |
| 2012/0101995 A1 | 4/2012 | Agetsuma et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0150888 A1 | 6/2012 | Hyatt et al. |
| 2012/0151265 A1 | 6/2012 | Bender et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0206653 A1 | 8/2012 | Graves et al. |
| 2012/0207449 A1 | 8/2012 | Angquist et al. |
| 2012/0209815 A1 | 8/2012 | Carson et al. |
| 2012/0209889 A1 | 8/2012 | Agnoli et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1 | 2/2013 | Chakraborty et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1 | 3/2013 | Mohanty et al. |
| 2013/0080919 A1 | 3/2013 | Kiang et al. |
| 2013/0110565 A1 | 5/2013 | Means, Jr. et al. |
| 2013/0110961 A1 | 5/2013 | Jadhav |
| 2013/0117226 A1 | 5/2013 | Jain et al. |
| 2013/0117337 A1 | 5/2013 | Dunham |
| 2013/0117376 A1 | 5/2013 | Filman et al. |
| 2013/0124458 A1 | 5/2013 | Barreto et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0179947 A1 | 7/2013 | Kline, III et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0226876 A1 | 8/2013 | Gati et al. |
| 2013/0227522 A1 | 8/2013 | Lerum et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0268999 A1 | 10/2013 | Kiang et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282658 A1 | 10/2013 | Besen et al. |
| 2013/0282830 A1 | 10/2013 | Besen et al. |
| 2013/0283106 A1 | 10/2013 | King et al. |
| 2013/0304679 A1 | 11/2013 | Fleming et al. |
| 2013/0304694 A1 | 11/2013 | Barreto et al. |
| 2013/0304697 A1 | 11/2013 | Movida |
| 2013/0305039 A1 | 11/2013 | Gauda |
| 2013/0325803 A1* | 12/2013 | Akirav ............ G06F 17/30578 707/634 |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1 | 2/2014 | Gilder et al. |

(56) References Cited

U.S. PATENT DOCUMENTS

| | | |
|---|---|---|
| 2014/0040206 A1 | 2/2014 | Ramakrishnan et al. |
| 2014/0047509 A1 | 2/2014 | Bhogal et al. |
| 2014/0052939 A1 | 2/2014 | Tseng et al. |
| 2014/0059002 A1 | 2/2014 | Lockhart et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082071 A1 | 3/2014 | Rexer |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172783 A1 | 6/2014 | Suzuki et al. |
| 2014/0172799 A1 | 6/2014 | Dorman |
| 2014/0188798 A1 | 7/2014 | Mackenzie et al. |
| 2014/0195485 A1 | 7/2014 | Dorman |
| 2014/0201138 A1 | 7/2014 | Dorman et al. |
| 2014/0201145 A1 | 7/2014 | Dorman et al. |
| 2014/0244600 A1 | 8/2014 | Schmidt et al. |
| 2014/0280605 A1 | 9/2014 | Zhang |
| 2014/0298420 A1 | 10/2014 | Barton et al. |
| 2014/0337291 A1 | 11/2014 | Dorman et al. |
| 2014/0337491 A1 | 11/2014 | Barreto et al. |
| 2014/0344456 A1 | 11/2014 | Buzbee et al. |
| 2014/0359286 A1 | 12/2014 | Wen et al. |
| 2014/0379647 A1 | 12/2014 | Smith et al. |
| 2015/0019723 A1 | 1/2015 | Kweon et al. |
| 2015/0039556 A1 | 2/2015 | Mackenzie et al. |
| 2015/0186668 A1 | 7/2015 | Whaley et al. |
| 2015/0237406 A1 | 8/2015 | Ochoa et al. |
| 2015/0339113 A1 | 11/2015 | Dorman et al. |
| 2016/0065672 A1 | 3/2016 | Savage et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Ivens, "Using and Troubleshooting Offline Files," Jun. 23, 2002, Windows IT Pro, Figure 1.

Ivens, "Configuring Offline Files," Apr. 21, 2002, Windows IT Pro, pp. 1-5.

U.S. Appl. No. 60/992,656, filed Dec. 5, 2007 Methods and Systems for Open Source Collaboration in an Application Service Provider Environment.

U.S. Appl. No. 61/055,901, filed May 23, 2008 Methods and Systems for Open Source Integration.

U.S. Appl. No. 13/646,339, filed Oct. 5, 2012 File Management System and Collaboration Service and Integration Capabilities With Third Party Applications.

U.S. Appl. No. 14/073,502, filed Nov. 6, 2013 Methods and Systems for Open Source Collaboration in an Application Service Provider Environment.

U.S. Appl. No. 61/434,810, filed Jan. 20, 2011 Real Time Notifications of Activity and Real-Time Collaboration in a Cloud-Based Environment With Applications in Enterprise Settings.

U.S. Appl. No. 13/152,982, filed Jun. 3, 2011 Real Time Notification of Activities that Occur in a Web-Based Collaboration Environment.

U.S. Appl. No. 13/166,733, filed Jun. 22, 2011 Multimedia Content Preview Rendering in a Cloud Content Management System.

U.S. Appl. No. 61/551,894, filed Oct. 26, 2011 Enhanced Multimedia Content Preview Rendering in a Cloud Content Management System.

U.S. Appl. No. 13/590,012, filed Aug. 20, 2012 Preview Pre-Generation Based on Heuristics and Algorithmic Prediction/Assessment of Predicted User Behavior for Enhancement of User Experience.

U.S. Appl. No. 13/297,230, filed Nov. 15, 2011 Enhanced Multimedia Content Preview Rendering in a Cloud Content Management.

U.S. Appl. No. 61/592,567, filed Jan. 30, 2012 Preview Pre-Generation Based on Heuristics and Algorithmic Prediction/Assessment of Predicted User Behavior for Enhancement of User Experience.

U.S. Appl. No. 61/506,013, filed Jul. 8, 2011 Collaboration Sessions in a Workspace on a Cloud-Based Content Management System.

U.S. Appl. No. 13/208,615, filed Aug. 12, 2011 Collaboration Sessions in a Workspace on a Cloud-Based Content Management System.

U.S. Appl. No. 61/592,394, filed Jan. 30, 2012 Extended Applications of Multimedia Content Previews in the Cloud-Based Content Management System.

U.S. Appl. No. 13/588,356, filed Aug. 17, 2012 Extended Applications of Multimedia Content Previews in the Cloud-Based Content Management System.

U.S. Appl. No. 13/968,357, filed Aug. 15, 2013 Automatic and Semi-Automatic Tagging Features of Work Items in a Shared Workspace for Metadata Tracking in a Cloud-Based Content Management System With Selective or Optional User Contribution.

U.S. Appl. No. 61/538,782, filed Sep. 23, 2011 Central Management and Control of User-Contributed Content in a Web-Based Collaboration Environment and Management Console Thereof.

U.S. Appl. No. 13/547,264, filed Jul. 12, 2012 Central Management and Control of User-Contributed Content in a Web-Based Collaboration Environment and Management Console Thereof.

U.S. Appl. No. 13/165,725, filed Jun. 21, 2011 Batch Uploading of Content to a Web-Based Collaboration Environment.

U.S. Appl. No. 61/554,450, filed Nov. 1, 2011 Platform and Application Independent Method for Document Editing and Version Tracking via a Web Browser.

U.S. Appl. No. 13/332,319, filed Dec. 20, 2011, Platform and Application Independent System and Method for Networked File Access and Editing.

U.S. Appl. No. 13/414,480, filed Mar. 7, 2012 Universal File Type Preview for Mobile Devices.

U.S. Appl. No. 13/345,502, filed Jan. 6, 2012 System and Method for Actionable Event Generation for Task Delegation and Management via a Discussion Forum in a Web-Based Collaboration Environment.

(56) References Cited

OTHER PUBLICATIONS

U.S. Appl. No. 13/619,439, filed Sep. 14, 2012 Batching Notifications of Activities That Occur in a Web-Based Collaboration Environment.
U.S. Appl. No. 61/579,551, filed Dec. 22, 2011 System Status Monitoring and Data Health Checking in a Collaborative Environment.
U.S. Appl. No. 13/464,813, filed Apr. 4, 2012 Health Check Services for Web-Based Collaboration Environments.
U.S. Appl. No. 13/405,164, filed Feb. 24, 2012 System and Method for Promoting Enterprise Adoption of a Web-Based Collaboration Environment.
U.S. Appl. No. 13/431,645, filed Mar. 27, 2012 Cloud Service or Storage Use Promotion via Partnership Driven Automatic Account Upgrades.
U.S. Appl. No. 61/649,869, filed Mar. 21, 2012 Selective Application Access Control via a Cloud-Based Service for Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed for Text-Based Searches and/or Metadata Extraction.
U.S. Appl. No. 13/829,663, filed Mar. 14, 2013 Cloud-Based Platform Enabled With Media Content Indexed for Text-Based Searches and/or Metadata Extraction.
U.S. Appl. No. 61/702,662, filed Sep. 18, 2012 Sandboxing Individual Applications to Specific User Folders in a Cloud-Based Service.
U.S. Appl. No. 13/830,016, filed Mar. 14, 2013 Sandboxing Individual Applications to Specific User Folders in a Cloud-Based Service.
U.S. Appl. No. 61/620,568, filed Apr. 5, 2012 Synchronization Client Selective Subfolder Syncing in a Cloud-Based Environment.
U.S. Appl. No. 13/856,607, filed Apr. 4, 2013 Method and Apparatus for Selective Subfolder Synchronization in a Cloud-Based Environment.
U.S. Appl. No. 61/641,824, filed May 2, 2012 Platform and Application Agnostic Method for Seamless File Access in a Mobile Environment.
U.S. Appl. No. 61/650,840, filed May 23, 2012 Platform and Application Agnostic Method for Seamless File Access in a Mobile Environment.
U.S. Appl. No. 61/653,876, filed May 31, 2012 Platform and Application Agnostic Method for Seamless File Access in a Mobile Environment.
U.S. Appl. No. 13/886,147, filed May 2, 2013 System and Method for a Third-Party Application to Access Content Within a Cloud-Based Platform.
U.S. Appl. No. 13/897,421, filed May 19, 2013 Methods, Architectures and Security Mechanisms for a Third-Party Application to Access Content in a Cloud-Based Platform.
U.S. Appl. No. 13/898,200, filed May 20, 2013 Metadata Enabled Third-Party Application Access of Content at a Cloud-Based Platform via a Native Client to the Cloud-Based Platform.
U.S. Appl. No. 13/898,242, filed May 20, 2013 Identification Verification Mechanisms for a Third-Party Application to Access Content in a Cloud-Based Platform.
U.S. Appl. No. 61/667,909, Jul. 3, 2012 Highly Available Ftp Servers for a Cloud-Based Service.
U.S. Appl. No. 13/565,136, filed Aug. 2, 2012 Load Balancing Secure Ftp Connections Among Multiple Ftp Servers.
U.S. Appl. No. 61/668,626, filed Jul. 6, 2012 Online Shard Migration.
U.S. Appl. No. 13/937,060, filed Jul. 8, 2013 System and Method for Performing Shard Migration to Support Functions of a Cloud-Based Service.
U.S. Appl. No. 61/668,698, filed Jul. 6, 2012 Identification of People as Search Results From Key-Word Based Searches of Content.
U.S. Appl. No. 13/937,101, filed Jul. 8, 2013 Identification of People as Search Results From Key-Word Based Searches of Content in a Cloud-Based Environment.
U.S. Appl. No. 61/668,791, filed Jul. 6, 2012 Systems and Methods for Specifying User and Item Identifiers Within an Email Address for Securely Submitting Comments via Email.
U.S. Appl. No. 13/937,124, filed Jul. 8, 2013 Systems and Methods for Securely Submitting Comments Among Users via External Messaging Applications in a Cloud-Based Platform.
U.S. Appl. No. 61/673,671, filed Jul. 19, 2012 Data Loss Prevention Methods and Architectures in a Cloud Service.
U.S. Appl. No. 13/944,184, filed Jul. 17, 2013 Data Loss Prevention (Dlp) Methods and Architectures by a Cloud Service.
U.S. Appl. No. 13/944,241, filed Jul. 17, 2013 Data Loss Prevention (Dlp) Methods by a Cloud Service Including Third Party Integration Architectures.
U.S. Appl. No. 61/694,492, filed Aug. 29, 2012 Method of Streaming File Encryption and Decryption to/From a Collaborative Cloud.
U.S. Appl. No. 13/975,827, filed Aug. 26, 2013 Method of Streaming File Encryption and Decryption to/From a Collaborative Cloud.
U.S. Appl. No. 61/701,823, filed Sep. 17, 2012 Use of a Status Bar Interface Element as a Handle for Revealing Additional Details.
U.S. Appl. No. 13/737,577, filed Jan. 9, 2013 System and Method of a Manipulative Handle in an Interactive Mobile User Interface.
U.S. Appl. No. 61/697,437, filed Sep. 6, 2012 Secure File Portability Between Mobile Applications Using a Server-Based Key Generation Service.
U.S. Appl. No. 13/776,358, filed Feb. 25, 2013 Secure File Portability Between Mobile Applications Using a Server-Based Key Generation Service.
U.S. Appl. No. 61/697,469, filed Sep. 6, 2012 Force Upgrade of a Mobile Application via Server Side Configuration Files.
U.S. Appl. No. 13/776,467, filed Feb. 25, 2013 Force Upgrade of a Mobile Application via Server Side Configuration File.
U.S. Appl. No. 61/697,477, filed Sep. 6, 2012 Disabling the Self-Referential Appearance of a Mobile Application in an Intent via a Background Registration.
U.S. Appl. No. 13/794,401, filed Mar. 11, 2013 Disabling the Self-Referential Appearance of a Mobile Application in an Intent via a Background Registration.
U.S. Appl. No. 61/697,511, filed Sep. 6, 2012 Channel for Openting and Editing Files From a Cloud Service Provider Based on Intents.
U.S. Appl. No. 13/776,535, filed Feb. 25, 2013 System and Method for Creating a Secure Channel for Inter-Application Communication Based on Intents.
U.S. Appl. No. 61/694,466, filed Aug. 12, 2012 Optimizations for Client and/or Server Feedback Information Enabled Real Time or Near Real Time Enhancement of Upload/Download Performance.
U.S. Appl. No. 61/702,154, filed Sep. 17, 2012 Optimizations for Client and/or Server Feedback Information Enabled Real Time or Near Real Time Enhancement of Upload/Download Performance.
U.S. Appl. No. 61/703,699, filed Sep. 20, 2012 Optimizations for Client and/or Server Feedback Information Enabled Real Time or Near Real Time Enhancement of Upload/Download Performance.
U.S. Appl. No. 14/293,685, filed Jun. 2, 2014 Enhancement of Upload and/or Download Performance Based on Client and/or Server Feedback Information.
U.S. Appl. No. 61/715,208, filed Oct. 17, 2012 Adaptive Architectures for Encryption Key Management in a Cloud-Based Environment.
U.S. Appl. No. 14/056,899, filed Oct. 17, 2013 Remote Key Management in a Cloud-Based Environment.
U.S. Appl. No. 61/709,086, filed Oct. 2, 2012 Visibility, Access Control, Advanced Reporting Api, and Enhanced Data Protection and Security Mechanisms for Administrators in an Enterprise.
U.S. Appl. No. 14/044,261, filed Oct. 2, 2013 System and Method for Enhanced Security and Management Mechanisms for Enterprise Administrators in a Cloud-Based Environment.
U.S. Appl. No. 61/709,653, filed Oct. 4, 2012 Corporate User Discover and Identification of Recommended Collaborators in a Cloud Platform.

(56) References Cited

OTHER PUBLICATIONS

U.S. Appl. No. 14/046,294, filed Oct. 4, 2013 Corporate User Discovery and Identification of Recommended Collaborators in a Cloud Platform.
U.S. Appl. No. 61/709,866, filed Oct. 4, 2012 Enhanced Quick Search Features, Low-Barrier Commenting/Interactive Features in a Collaboration Platform.
U.S. Appl. No. 14/046,523, filed Oct. 4, 2013 Enhanced Quick Search Features, Low-Barrier Commenting/Interactive Features in a Collaboration Platform.
U.S. Appl. No. 61/709,407, filed Oct. 4, 2012 Seamless Access, Editing, and Creation of Files in a Web Interface or Mobile Interface to a Cloud Platform.
U.S. Appl. No. 14/046,726, filed Oct. 4, 2013 Seamless Access, Editing, and Creation of Files in a Web Interface or Mobile Interface to a Collaborative Cloud Platform.
U.S. Appl. No. 61/70,182, filed Oct. 5, 2012 Embedded Html Folder Widget for Accessing a Cloud Collaboration Platform and Content From Any Site.
U.S. Appl. No. 14/047,223, filed Oct. 7, 2013 System and Method for Generating Embeddable Widgets Which Enable Access to a Cloud-Based Collaboration Platform.
U.S. Appl. No. 61/753,761, Conflict Resolution, Retry Condition Management, and Handling of Problem Files for the Synchronization Client to a Cloud-Based Platform.
U.S. Appl. No. 61/839,325, filed Jun. 23, 2013 Systems and Methods for Improving Performance of a Cloud-Based Platform.
U.S. Appl. No. 14/314,887, filed Jun. 25, 2014 Systems and Methods for Managing Upgrades, Migration of User Data and Improving Performance of a Cloud-Based Platform.
U.S. Appl. No. 61/839,331, filed Jun. 25, 2013 Systems and Methods for Providing Shell Communication in a Cloud-Based Platform.
U.S. Appl. No. 14/314,677, filed Jun. 25, 2014 Systems and Methods for Providing Shell Communication in a Cloud-Based Platform.
U.S. Appl. No. 13/954,680, filed Jul. 30, 2013 System and Method for Advanced Control Tools for Administrators in a Cloud-Based Service.
U.S. Appl. No. 14/194,091, filed Feb. 28, 2014, Scalability Improvement in a System Which Incrementally Updates Clients With Events That Occurred in a Cloud-Based Collaboration Platform.
U.S. Appl. No. 13/953,668, filed Jul. 29, 2013 System and Method for Advanced Search and Filtering Mechanisms for Enterprise Administrators in a Cloud-Based Environment.
U.S. Appl. No. 14/026,674, filed Sep. 13, 2013 Configurable Event-Based Automation Architecture for Cloud-Based Collaboration Platforms.
U.S. Appl. No. 61/877,917, filed Sep. 13, 2013 Systems and Methods for Configuring Event-Based Automation in Cloud-Based Collaboration Platforms.
U.S. Appl. No. 14/075,849, filed Nov. 8, 2013 Systems and Methods for Configuring Event-Based Automation in Cloud-Based Collaboration Platforms.
U.S. Appl. No. 14/027,149, filed Sep. 13, 2013 Simultaneous Editing/Accessing of Content by Collaborator Invitation Through a Web-Based or Mobile Application to a Cloud-Based Collaboration Platform.
U.S. Appl. No. 14/042,473, filed Sep. 30, 2013 Simultaneous Editing/Accessing of Content by Collaborator Invitation Through a Web-Based or Mobile Application to a Cloud-Based Collaboration Platform.
U.S. Appl. No. 14/026,837, filed Sep. 13, 2013 Mobile Device, Methods and User Interfaces Thereof in a Mobile Device Platform Featuring Multifunctional Access and Engagement in a Collaborative Environment Provided by a Cloud-Based Platform.
U.S. Appl. No. 14/166,414, filed Jan. 28, 2014 System and Method of a Multi-Functional Managing User Interface for Accessing a Cloud-Based Platform via Mobile Devices.
U.S. Appl. No. 14/027,147, filed Sep. 13, 2013 System and Method for Rendering Document in Web Browser or Mobile Device Regardless of Third-Party Plug-In Software.
U.S. Appl. No. 61/877,938, filed Sep. 13, 2013 High Availability Architecture for a Cloud-Based Concurrent-Access Collaboration Platform.
U.S. Appl. No. 14/474,507, filed Sep. 2, 2014 High Availability Architecture for a Cloud-Based Concurrent-Access Collaboration Platform.
U.S. Appl. No. 14/472,540, filed Aug. 29, 2014 Enhanced Remote Key Management for an Enterprise in a Cloud-Based Environment.
U.S. Appl. No. 14/474,008, filed Aug. 28, 2014 Configurable Metadata-Based Automation and Content Classification Architecture for Cloud-Based Collaboration Platforms.
"Average Conversion Time for a D60 RAW file?" http://www.dpreview.com, Jul. 22, 2002, 4 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
"Understanding Metadata," National Information Standards Organization, NISO Press, 2004, 20 pages.
Burns, "Developing Secure Mobile Applications for Android," Oct. 2008, Version 1.0, 1-28 pages.
Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Conner, "Google Apps: The Missing Manual," published by O'Reilly Media, May 27, 2008, 24 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13158415.3, Applicant: Box, Inc. Mailed Jun. 4, 2013, 8 pages.
Exam Report for EP13168784.0, Applicant: Box, Inc. Mailed Nov. 21, 2013, 7 pages.
Exam Report for EP13177108.1, Applicant: Box, Inc. Mailed May 26, 2014, 6 pages.
Exam Report for EP13185269.1, Applicant: Box, Inc. Mailed Jan. 28, 7 pages.
Exam Report for GB1300188.8, Applicant: Box, Inc. Mailed May 31, 2013, 8 pages.

(56) References Cited

OTHER PUBLICATIONS

Exam Report for GB1306011.6, Applicant: Box, Inc. Mailed Apr. 18, 2013, 8 pages.
Exam Report for GB1308842.2, Applicant: Box, Inc. Mailed Mar. 10, 2014, 4 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 23, 2013, 5 pages.
Exam Report for GB1312095.1, Applicant: Box, Inc. Mailed Dec. 12, 2013, 7 pages.
Exam Report for GB1312264.3, Applicant: Box, Inc. Mailed Mar. 24, 2014, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1318792.7, Applicant: Box, Inc. Mailed May 22, 2014, 2 pages.
Exam Report for GB1320902.8, Applicant: Box, Inc. Mailed Dec. 20, 2013, 6 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/034765, Applicant: Box, Inc., Mailed Jan. 20, 2014, 15 pages.
International Search Report and Written Opinion for PCT/US2013/035404, Applicant: Box, Inc., Mailed Jun. 26, 2013, 11 pages.
International Search Report and Written Opinion for PCT/US2013/039782, Applicant: Box, Inc., Mailed Aug. 28, 2013, 15 pages.
Internet Forums, http://web.archive.org/web/20100528195550/http://en.wikipedia.org/wiki/Internet_forums, Wikipedia, May 30, 2010, pp. 1-20.
John et al., "Always Sync Support Forums—View topic—Allway sync funny behavior," Allway Sync Support Forum at http://syncenter.com, Mar. 28, 2011, XP055109680, 2 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc. Mailed May 8, 2014, 5 pages.
Patent Court Document of Approved Judgment for GB0602349.3 and GB0623571.7; Mar. 3, 2009, 17 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. Mailed Feb. 7, 2014, 9 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Apr. 3, 2014, 6 pages.
Sommerer, "Presentable Document Format: Improved On-demand PDF to HTML Conversion," retrieved from the internet, http://research.microsoft.com, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Exam Report for GB1311459.0 Applicant: Box, Inc. Mailed Aug. 19, 2013, 6 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1220644.7 Applicant: Box, Inc. Mailed May 1, 2015, 4 pages.
Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.

(56) References Cited

OTHER PUBLICATIONS

"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Sommerer, "Presentable Document Format: Improved On-demand PDF to HTML Conversion," retrieved from the internet, http://research.microsoft.com, Nov. 2004, 8 pages.
U.S. Appl. No. 61/592,567, filed Jan. 30, 2012 Preview Pre-Generation Based on Heuristics and Algorithmic Predictions/Assessment of Predicted User Behavior for Enhancement of User Experience.
U.S. Appl. No. 13/332,319, filed Dec. 20, 2011 Platform and Application Independent System and Method for Networked File Access and Editing.
U.S. Appl. No. 13/524,501, Jun. 15, 2012 Resource Effective Incremental Updating of a Remote Client With Events Which Occurred via a Cloud-Enabled Platform.
U.S. Appl. No. 61/620,554, Apr. 5, 2012 Device Pinning Capability for Enterprise Cloud Service and Storage Accounts.
U.S. Appl. No. 61/649,869, filed Mar. 21, 2012, Selective Application Access Control via a Cloud-Based Service for Security Enhancement.
U.S. Appl. No. 61/667,909, filed Jul. 3, 2012 Highly Available Ftp Servers for a Cloud-Based Service.
U.S. Appl. No. 13/937,124, filed Jul. 8, 2013 Systems and Methods for Securely Submitting Comments Among Users via External Messaging Application in a Cloud-Based Platform.
U.S. Appl. No. 13/794,401, Mar. 11, 2013 Disabling the Self-Referential Appearance of a Mobile Application in an Intent via a Background Registration.
U.S. Appl. No. 61/697,511, filed Sep. 6, 2012 Channel for Opening and Editing Files From a Cloud Service Provider Based on Intents.
U.S. Appl. No. 61/709,086 filed Oct. 2, 2012 Visibility, Access Control, Advanced Reporting Api, and Enhanced Data Protection and Security Mechanisms for Administrators in an Enterprise.
U.S. Appl. No. 61/709,653, filed Oct. 4, 2012 Corporate User Discovery and Identification of Recommended Collaborators in a Cloud Platform.
U.S. Appl. No. 61/710,182, filed Oct. 5, 2012 Embedded Html Folder Widget for Accessing a Cloud Collaboration Platform and Content From any Site.
U.S. Appl. No. 14/135,311, filed Dec. 19, 2012 Methods and Apparatus for Synchronization of Items With Read-Only Permissions in a Cloud-Based Environment.
U.S. Appl. No. 61/877,938, filed Sep. 13, 2013 High-Availability Architecture for a Cloud-Based Concurrent-Access Collaboration Platform.
"How-to Geek, How to Sync Specific Folders With Dropbox," originally written on Jun. 1, 2010 and archived version retrieved from WaybackMachine as published online on Jul. 4, 2014 at http://www.howtogeek.com/howto/18285/sync-specific-folders-with-dropbox, 5 pages.
Exam Report for GB1413461.3; Applicant: Box, Inc. Mailed Aug. 21, 2015, 6 pages.
Fu et al., "Efficient and Fine-Grained Sharing of Encrypted Files," Quality of Service (IWQos), 2010 18th International Workshop on year 2010, pp. 1-2.
U.S. Appl. No. 61/751,578, filed Jan. 11, 2013 Functionalities, Features and User Interface of a Synchronization Client to a Cloud-Based Environment.
U.S. Appl. No. 14/153,726, filed Jan. 13, 2014 Functionalities, Features and User Interface of a Synchronization Client to a Cloud-Based Environment.
U.S. Appl. No. 14/158,626, Conflict Resolution, Retry Condition Management, and Handling of Problem Files for the Synchronization Client to a Cloud-Based Platform.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/564,425, filed Nov. 29, 2011 Mobile Platform Folder Synchronization and Offline Synchronization.
U.S. Appl. No. 61/568,430, filed Dec. 8, 2011 Mobile Platform File and Folder Selection Functionalities for Offline Access and Synchronization.
U.S. Appl. No. 13/689,544, filed Nov. 29, 2012 Mobile Platform File and Folder Selection Functionalities for Offline Access and Synchronization.
U.S. Appl. No. 61/560,685, filed Nov. 16, 2011 Temporal and Spatial Processing and Tracking of Events in a Web-Based Collaboration Environment for Asynchronous Delivery in an Ordered Fashion.
U.S. Appl. No. 13/524,501, filed Jun. 15, 2012 Resource Effective Incremental Updating of a Remote Client With Events Which Occurred via a Cloud-Enabled Platform.

(56) References Cited

OTHER PUBLICATIONS

U.S. Appl. No. 13/526,437, filed Jun. 18, 2012 Managing Updates at Clients Used by a User to Access a Cloud-Based Collaboration Service.
U.S. Appl. No. 14/658,423, filed Mar. 16, 2015 Managing Updates at Clients Used by a User to Access a Cloud-Based Collaboration Service.
U.S. Appl. No. 61/620,554, filed Apr. 5, 2012 Device Pinning Capability for Enterprise Cloud Service and Storage Accounts.
U.S. Appl. No. 13/493,922, filed Jun. 11, 2012 Device Pinning Capability for Enterprise Cloud Service and Storage Accounts.
U.S. Appl. No. 61/622,868, filed Apr. 11, 2012 Web and Desktop Client Synchronization of Mac Packages With a Cloud-Based Platform.
U.S. Appl. No. 13/618,993, filed Sep. 14, 2012 Cloud Service Enabled to Handle a Set of Files Depicted to a User As a Single File in a Native Operating System.
U.S. Appl. No. 61/643,116, filed May 4, 2012 Hbase Redundancy Implementation for Action Log Framework.
U.S. Appl. No. 13/890,172, filed May 8, 2013 Repository Redundancy Implementation of a System Which Incrementally Updates Clients With Events That Occurred via a Cloud-Enabled Platform.
U.S. Appl. No. 13/888,308, filed May 6, 2013 Repository Redundancy Implementation of a System Which Incrementally Updates Clients With Events That Occurred via a Cloud-Enabled Platform.
U.S. Appl. No. 61/693,521, filed Aug. 27, 2012 Backend Implementation of Synchronization Client Selective Subfolder Syncing in a Cloud-Based Environment.
U.S. Appl. No. 14/010,851, filed Aug. 27, 2013 Server Side Techniques for Reducing Database Workload in Implementing Selective Subfolder Synchronization in a Cloud-Based Environment.
U.S. Appl. No. 61/751,578, filed Jan. 11, 2013 Functionalities, Features, and User Interface of a Synchronization Client to a Cloud-Based Environment.
U.S. Appl. No. 14/153,726, filed Jan. 13, 2014 Functionalities, Features, and User Interface of a Synchronization Client to a Cloud-Based Environment.
U.S. Appl. No. 61/750,474, filed Jan. 9, 2013 File System Event Monitor and Event Filter Pipeline for a Cloud-Based Platform.
U.S. Appl. No. 14/149,586, filed Jan. 7, 2014 File System Monitoring in a System Which Incrementally Updates Clients With Events That Occurred in a Cloud-Based Collaboration Platform.
U.S. Appl. No. 61/753,761 Conflict Resolution, Retry Condition Management, and Handling of Problem Files for the Synchronization Client to a Cloud-Based Platform.
U.S. Appl. No. 14/158,626 Conflict Resolution, Retry Condition Management, and Handling of Problem Files for the Synchronization Client to a Cloud-Based Platform.
U.S. Appl. No. 61/739,296, filed Dec. 19, 2012 Synchronization of Read-Only Files/Folders by a Synchronization Client With a Cloud-Based Platform.
U.S. Appl. No. 14/135,311, filed Dec. 19, 2013 Method and Apparatus for Synchronization of Items With Read-Only Permissions in a Cloud-Based Environment.
U.S. Appl. No. 61/748,399, filed Jan. 2, 2013 Handling Action Log Framework Race Conditions for a Synchronization Client to a Cloud-Based Environment.
U.S. Appl. No. 14/146,658, filed Jan. 2, 2014 Race Condition Handling in a System Which Incrementally Updates Clients With Events That Occurred in a Cloud-Based Collaboration Platform.
U.S. Appl. No. 61/822,170, filed May 10, 2013 Identification and Handling of Items to Be Ignored for Synchronization With a Cloud-Based Platform by a Synchronization Client.
U.S. Appl. No. 14/275,890, filed May 13, 2014 Identification and Handling of Items to Be Ignored for Synchronization With a Cloud-Based Platform by a Synchronization Client.
U.S. Appl. No. 61/822,191, filed May 10, 2013 Systems and Methods for Depicting Item Synchronization With a Cloud-Based Platform by a Synchronization Client.
U.S. Appl. No. 14/275,401, filed May 12, 2014 Top Down Delete or Unsynchronization on Delete of and Depiction of Item Synchronization With a Synchronization Client to a Cloud-Based Platform.
U.S. Appl. No. 61/834,756, filed Jun. 13, 2013 Systems and Methods for Event Building, Collapsing, or Monitoring by a Synchronization Client of a Cloud-Based Platform.
U.S. Appl. No. 61/838,176, filed Jun. 21, 2013 Maintaining and Updating File System Shadows on a Local Device by a Synchronization Client of a Cloud-Based Platform.
U.S. Appl. No. 14/312,482, filed Jun. 23, 2014 Maintaining and Updating File System Shadows on a Local Device by a Synchronization Client of a Cloud-Based Platform.
U.S. Appl. No. 61/860,050, filed Jul. 30, 2013 Scalability Improvement in a System Which Incrementally Updates Clients With Events That Occurred in a Cloud-Based Collaboration Platform.
U.S. Appl. No. 14/194,091, filed Feb. 28, 2014 Scalability Improvement in a System Which Incrementally Updates Clients With Events That Occurred in a Cloud-Based Collaboration Platform.
Exam Report for GB1316532.9; Applicant: Box, Inc., Mailed Mar. 8, 2016, 3 pages.
Cicnavi, "Offline Files in XP," Nov. 29, 2010, UtilizeWindows, pp. 1-6.

* cited by examiner

SYSTEMS AND METHODS FOR SYNCHRONIZATION EVENT BUILDING AND/OR COLLAPSING BY A SYNCHRONIZATION COMPONENT OF A CLOUD-BASED PLATFORM

CROSS-REFERENCE TO RELATED APPLICATIONS

This application claims priority to and benefit from U.S. Provisional Application Ser. No. 61/834,756 titled "SYSTEMS AND METHODS FOR EVENT BUILDING, COLLAPSING, OR MONITORING BY A SYNCHRONIZATION CLIENT OF A CLOUD-BASED PLATFORM" filed on Jun. 13, 2013, the entire content of which is expressly incorporated by reference herein.

BACKGROUND

In a sharing and collaboration environment, multiple users share, access and otherwise perform actions or tasks on content and files in a shared workspace, where any number of users may have access to a given file or may want to or need to perform an action on the file at any given time. Content such as audio/video files, documents or email messages on a user device can be synced with a cloud server and content from the cloud server can be synced with a user device. The syncing occurs when a new content arrives at the server, or when a user makes a request. Syncing can result in new content, updated content and/or deleted content.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
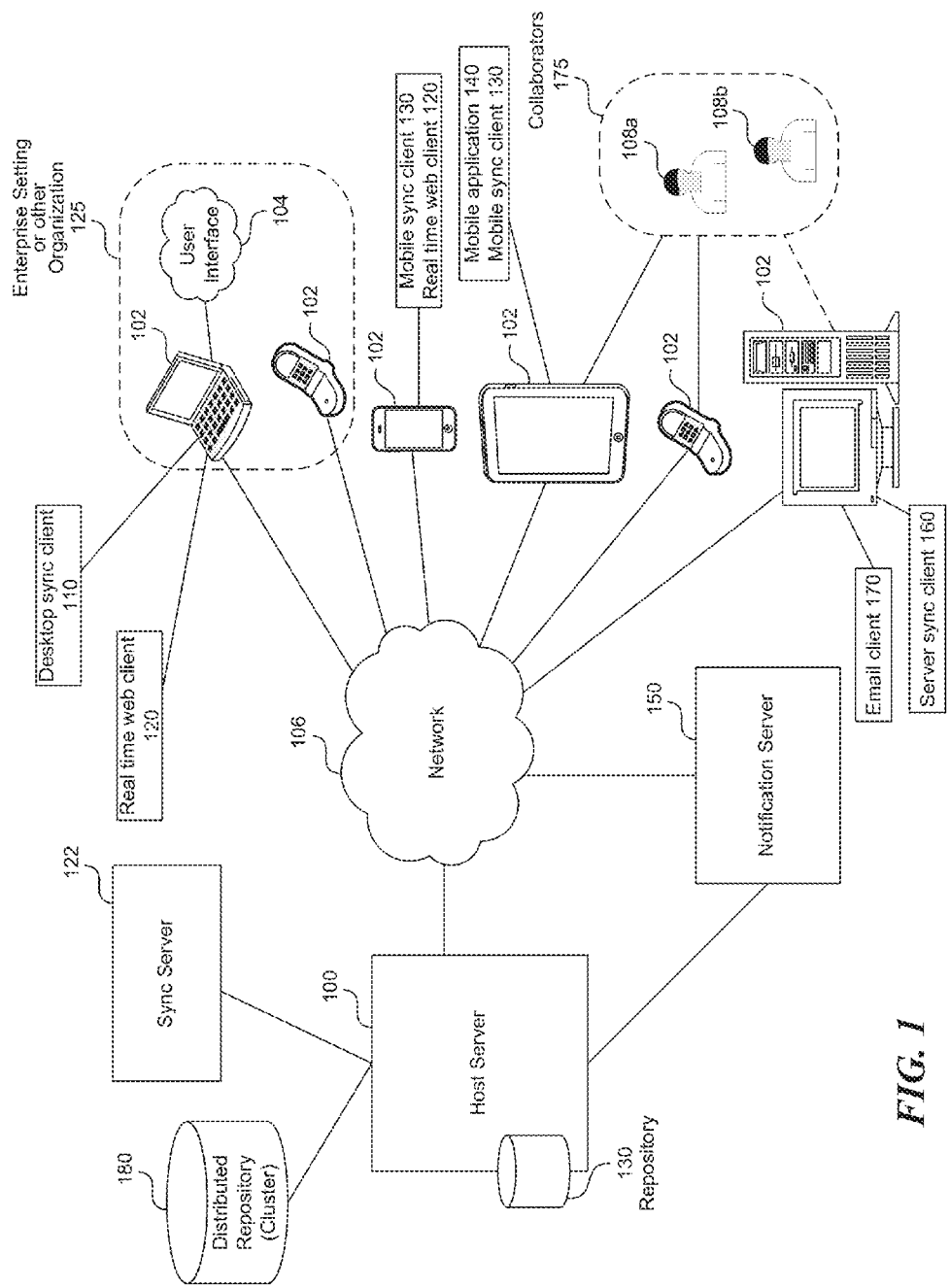
FIG. 1 illustrates an example diagram of an environment suitable for operating a system implementing a synchronization component (e.g., a synchronization client or a server) for synchronization event building and/or collapsing.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

1. Event Building

The present disclosure includes technology for event building by a synchronization client ("sync client") of a cloud-based collaboration and/or storage service ("cloud-based platform").

Local event monitoring by the synchronization client ("sync client"), in some embodiments can be performed in multiple modes. For example, in a full scan mode, the synchronization client examines the entire sync directory and generates differences between what is present in file system and what is in the local database. In the listen mode, a third party library (e.g., 'watchdog') is used to turn file system changed notifications into events.

Events generated by the listen mode and full scan mode have different information, which can break a contract required in event processing that events from both generators are the same and may weaken the system's abstractions. The process of converting a file system change notification to an actual event may require that watchdog perform a full scan of a synchronization directory, making the code less DRY (don't repeat yourself principal) and making bug fixing and optimizations far more complicated. Finally, the logic for switching between the full scan and listen modes can be complicated, error prone, and/or difficult to test.

These challenges can be compounded in some embodiments when local event monitoring is considered alongside the cloud-based platform server event monitoring. For example, the situation of turning a set of differences between trees into a set of events that can be consistently applied has been solved both for the server side and the local side in totally different ways in some embodiments. In addition to algorithmic or process differences, there can also be differences in the data structures used to represent various stages of processing and in the architecture of how events are generated in some embodiments.

The process and architectural differences may not be reflective of true differences between the cloud-based platform (e.g., cloud-based collaboration and/or storage services) server and local storage (of which there are some) and serve to reduce the leveragability of and maintainability of the synchronization codebase.

Various embodiments of the disclosed technology refactors (i.e., applies behavior preserving code transformations that improve source code) event monitoring (event generation and the filter pipeline) systems and methods to address these problems. Some embodiments can maximize code maintainability through encapsulation and reuse. Specifically, various embodiments of the disclosed technology can quickly and incrementally implement critical pieces of the refactoring without delay, while deferring implementation of the less critical pieces for later.

Various embodiments of the disclosed technology can:

1. Remove duplicated full scan logic between the sync client and a watchdog ("watchdog" as used herein refers to the "watchdog" process found in various operating systems (e.g., including MAC operating systems)).
2. Collapse the full scan and listen modes into one mode.
3. Add support for partial scanning of only affected folders.
4. Ensure with high confidence that events are only released into filter pipelines when they are fully consistent and no longer subject to race conditions. In particular, filter pipeline inconsistencies can be considered unrecoverable errors in some embodiments.
5. Provide strongly defined contracts for the information and behavior guarantees on data structures used in the filter pipeline.
6. Move file system access into the initial scanner and out of the filter pipeline in order to strengthen contracts and limit race conditions.
7. Reuse common algorithms and data structures between the cloud-based platform server and the local device.

Example embodiments can be encapsulated so developers can largely defer optimizations for later.

Example Considerations

Event monitoring is the process of turning file system notifications from the file system observers into synchronization events that are suitable for executing on the opposite file system (e.g. remote cloud based storage or local storage). This can be done in some embodiments through a series of transformations on data structures that are outlined here.

File System Notifications

In some embodiments, file system notifications can be generated by file system observers and contain information about the file or folder that changed. In some embodiments, on the cloud-based platform server, action log framework (ALF) events can include information about the new item state and minimal information about the type of change that occurred. On the local side, in some embodiments, notifications can contain only the parent folder of the item that has changed. Accordingly, these notifications may need to be processed in order to be useable.

Item Change

In some embodiments, an item change represents that a specific item changes and can contain the full new state of the item. In some embodiments, on the local filesystem, item changes can be generated by taking a consistent snapshot of the folder whose children have changed and comparing the new snapshot with a reference snapshot. In some embodiments, on the cloud-based platform (e.g., cloud-based collaboration and/or storage services), the item changes can be generated either in a similar manner during full scans or by directly passing through the ALF event. These changes can contain only information about the state of the item and do not convey any information about the order in which the changes must be applied in some embodiments.

Raw Events

Raw events can be generated, in some embodiments, by ordering item changes and producing a set of executable actions that will bring the reference into sync with the new state of the file system. Raw events can be defined relative to the file system identifier of the item. In some embodiments there is no guarantee that produced events will actually be executed.

Sync Events

In some embodiments, synchronization events can be generated by mapping filesystem-specific identifiers to logical identifiers so that the event can be executed directly on the opposite filesystem. In some embodiments, once a sync event is produced, synchronization is committed to either executing the sync event action or marking the item as a problem item.

Item Change Generation

In some embodiments, this component builds item changes with one or more of the following properties:

1. An item change provides all of the information about the new state on the filesystem required for turning the change into a sync event. In other words, no parts of the component will need to access the filesystem once the item change is produced.
2. An item change provides a consistent picture of what actually existed on the file system at some point in time. For example, if there is an item change with new state name 'foo' and parent 'bar', at some point in time, this item really was named 'foo' and at the same time had parent 'bar'
3. The ordering of item changes returned by this component has no meaning. Thus, if a scan of a folder generates a number of changes, there is no guarantee that these changes can be applied in order without generating an inconsistent state (e.g., like two different inodes having the same path at the same time). An inode or an index node is a file structure on a file system that includes all file information except the file contents and the file name). The inode of each file uses a pointer to point to the specific file, directory or object and is typically a unique number.

On both the remote cloud-based platform and the local storage, the process for item change generation in some embodiments, is to obtain a set of dirty items and to then difference the new state of those items against their last known state, which is stored in a reference snapshot inside the filesystem scanner. A dirty item is generally an item (e.g., file, folder, directory, etc.) that has been written to or modified and the modifications are yet to be written to the underlying file system. In some embodiments, on the remote file system, the list of dirty items can be obtained by listening to the ALF stream, which either directly provides dirty items and their new states or provides notifications that specific folders are recursively dirty, requiring a scan of the affected folder to obtain the resulting dirty items. On the local system in some embodiments, the filesystem observer may only provide notifications about dirty folders. Accordingly, the local system may have to perform a partial scan in order to determine the full set of dirty items. On startup, both sides can be initialized with an event marking the root folder as recursively dirty in some embodiments.

In some embodiments, partial scanning is achieved through the following method at least in part:

1. Generate a consistent snapshot
   a. On the cloud-based platform, this can be achieved through the folders endpoint with transactional GAT (get account tree).
   b. On the local storage or device, a snapshot can be built by walking or traversing the directory and recording all entries. If there are no dirty folders added to the queue for a certain period of time (e.g., ~100 ms), the snapshot can be called consistent. If there is a new file system notification, a snapshot can be built for that notification, and a new snapshot is built by merging the snapshot for the dirty folder on top of the original snapshot.
2. Generate differences between the reference snapshot and the current snapshot
   a. Generate a list of all item ids that are in the reference snapshot and in the domain of the current snapshot
   b. Loop through all elements in the current snapshot, and yield item changes for everything that has a different item state in the reference snapshot. Further, remove all observed items from the all item id list.
   c. Yield item changes with delete set to true for all items remaining in the all item id list.
3. Update the reference snapshot by applying the new snapshot on top of it. Note that for the first run, the reference snapshot can be built from the persisted Last Sync Item Store (LSIS) in some embodiments.

In some embodiments, item changes can be fed by the monitor into the filter pipeline using the same rules about flushing buffers as before. In some embodiments, however, there are no state transitions in the monitor, as there is no difference between full scan and listening mode.

In some embodiments the reference snapshot used for determining which items have changed during the partial scan must reflect not only the changes detected during the last partial scan but also any changes made by the sync executors on the monitored file system. This may be necessary in some embodiments because it is possible for the changes performed by the sync executors to be undone by other operations on the monitored filesystem before they can be detected by a scan. For example, a newly created item can be immediately deleted or a newly renamed item can be immediately renamed back to its original name. If the reference snapshot is not aware of the change made by the sync executors, it will not know to generate an item change for these items since nothing has changed about the item since the last scan. As a result, the file systems will fall out of sync. Another benefit of pushing the most up to date information about the monitored filesystem into the scanners is that it gives a completely state based means of handling echoback events. Because the scanner already has the information about the changes made to the monitored filesystem by the sync executors, it will not pick up those changes during its next partial scan.

An example pseudo code for building a reference snapshot for the file system and on a new notification, generating item changes using a diffing algorithm. In some embodiments, the algorithm for the cloud-based platform uses ALF instead of file system observers and has no requirement for a settle time.

```
class LocalFSScanner:
    def _on_start( ):
        # Launch the observer that will feed dirty folders into the queue.
        self._launch_fs_observer( )
    def _get_next_item_change( ):
        while not should_stop:
            dirty_dir, recursive = self._dirty_dir_queue.get( )
            consistent_snapshot = None
            while dirty_dir:
                consistent_snapshot = FSSnapshot(list_dir,
```

```
        item_state_callback, dirty_dir, recursive)
                dirty_dir, recursive =
    self._dirty_dir_queue.get(0.1) # 100 ms
                difference = FSSnapshotDiffer(self._reference,
    consistent_snapshot)
                for item_change in difference.events( ):
                    yield item_change
                # Update the reference - this is built to begin with
    from LSIS in init
                self._reference = consistent_snapshot
```

An example pseudo code for building a snapshot of the file system at a point in time is provided below. Whether or not the snapshot is consistent can be left to the caller to deal with in some embodiments.

```
class FSSnapshot:
    # list_dir_callback -> map a path to a list of path, item_state
for children
    #                   Note that it needs the parent id to build
the item_state
    # item_state_callback -> map a path to an item_state
    # path -> the path to start with
    # recursive -> whether to recurse or not
    def ___init___(list_dir_callback, item_state_callback, path,
recursive):
        self._update_for_path('', True)
    def _update_for_path(path, recursive, item_id=None):
        item_id = item_id or
self._item_state_callback(path).item_id
        for item_path, item_state in self._list_dir_callback(path,
item_id):
            # Record the entry (e.g., in a dictionary)
            self._record_item_state_for_item_id(item_state,
item_state.item_id)
            # Recurse
            if recursive and item_state.item_type ==
ItemType.FOLDER:
                self._update_for_path(item_path, True,
item_state.item_id)
    # Public accessors:
    def item_states( )   # return all item states in the dictionary
    def item_state_for_item_id(item_id)   # return the item state for
the item_id
    def contains_item_id(item_id)   # returns whether there's an entry
for item_id or not
```

An example pseudo code for building item change events from a pair of snapshots is provided below.

```
class FSSnapshotDiffer:
    def events( ):
        # Build a set of all the item ids in the reference snapshot
        all_reference_item_ids = set([item_state.item_id for
item_state in self._ref_snapshot.item_states( )])
        # Loop through all the item ids in the new snapshot and
check for changes
        for new_item_state in self._new_snapshot.item_states( ):
            # Remove it from the list of all item ids. Be
careful as you may see an item_id more than once due to hard links
            if new_item_state.item_id in all_reference_item_ids:
                all_reference_item_ids.remove(new_item_state.item_id)
            if
self._ref_snapshot.contains_item_id(new_item_state.item_id):
                # If the reference contains this item id, we
need to check
                # if there have been any changes to the item
                ref_item_state =
self._ref_snapshot.item_state_for_item_id(new_item_id)
                # If the item states differ, return an item
change
                if ref_item_state != new_item_state:
                    yield ItemChange(new_item_state)
            else:
                # if the reference does not contain it, then
it's a create
                yield ItemChange(new_item_state)
        # Lastly, process all the deletes (the items that are not
in the new snapshot)
        for item_id in all_reference_item_ids:
            ref_item_state =
self._ref_snapshot.item_state_for_item_id(item_id)
            yield
ItemChange(ref_item_state.copy_with_changes(is_deleted=True))
```

Item Change Ordering

In some embodiments, the item changes emitted by the filesystem scanners will occur in order per item but will not have a well-defined inter-item ordering. In some embodiments, it is the responsibility of the item change re-orderer to detect inter-item event dependencies and re-order the changes as necessary. It can do this by checking each change against a snapshot of the monitored filesystem to see if the new state brought about by the change is consistent with the rest of the filesystem. If it is, the change can be passed on to the rest of the filter pipeline and the snapshot can be updated to reflect the change. Otherwise, the change can be buffered until another item change alters the snapshot in such a way as to make the buffered change consistent. In some embodiments, if an item change remains buffered for longer than a filesystem specific timeout, then it is assumed that either a change has been missed by the filesystem scanner or the filesystem scanner has returned corrupt changes, and in either case, an assertion is raised and the application is taken down.

For each change, the re-orderer can perform the following checks in some embodiments to determine if the change is consistent with the existing snapshot:
1) If the change is for a deleted folder, the snapshot is checked to see that the folder does not contain any children.
2) If the change is for a non-deleted item, the snapshot is checked to see that the parent folder of the item exists and that no other item with the same name exists in the parent folder.
3) If the change represents a move, the snapshot is checked to see that the item is not an ancestor of its new parent.

In addition to performing these checks, in some embodiments, the re-orderer can also be capable of detecting and handling circular renames by manufacturing an item change for one of the items that moves the item to a temporary location.

Like the filesystem snapshot used in the scanner for generating raw events, the filesystem snapshot used when re-ordering the raw events can reflect both the changes made by raw events emitted from the generator as well as the changes made by the sync executors on the monitored filesystem in some embodiments. This can be performed because the re-orderer will now no longer receive information about echoback events from the scanner and so it needs to get that information directly from the executor in order to have a full picture of the monitored filesystem.

Raw Event Generation

Following the item change ordering, raw events can be produced by diffing the new item state in the item change against the old state in the re-orderer's snapshot (i.e., comparing the new item state with the old state to determine how and whether the two items differ). This can include detecting when an item has transitioned from syncable to unsyncable or vice versa and generating create and delete events as appropriate. The raw events produced can have the following properties in some embodiments:
1. They describe executable actions like create, delete, etc. However, no guarantees are made as to whether or not the business logic dictates that they should be executed.
2. Raw events are produced in an order that can be consistently applied to a frozen file system without generating any inconsistencies. This means that the actions represented by a raw event can only fail during actual execution (because of changes to the file system) and not during processing. In particular, a filter pipeline inconsistency is considered an unrecoverable error.
3. Raw events refer to the file system id, rather than the logical id. On the cloud-based platform, these two are the same, but on local, there is a difference between inode and the logical id.

Sync Event Building

In some embodiments, raw events can then be processed into sync events suitable for execution. On the cloud-based platform, this can be a straight translation in some embodiments since the filesystem id on the cloud-based platform can be suitable for use as a logical id for the item. On the local storage system or the local device, the filesystem id can change while the item remains logically the same and so the atomic save filter can be necessary in order to maintain the mapping between logical ids and their underlying filesystem ids. No other filters may be required on the local storage system to do this conversion in some embodiments. Sync events can have the following properties in some embodiments:
1. They describe executable actions like create, delete, etc., that sync is committed to at least attempting to execute.
2. They are produced in an order that can be consistently applied to a frozen file system, and should only be validated by actually executing their action on the appropriate filesystem.
3. They refer to logical ids rather than file system ids.

Event Collapsing

The present disclosure also includes technology for event collapsing by a sync client and/or a sync server of a cloud-based platform.

In some embodiments, event collapsing can be part of how the Sync Event Queue handles the failed events that are not intermittent (e.g. the create event which failed due to a name conflict on the opposite file system). For those kinds of failures, simply repeating the same event does not solve the problem in some embodiments. Instead, it relies on some later event (either from the user or from the sync client) to succeed. For example, "Create A" which fails due to name conflict has to be collapsed with "Rename A to A-copy" (which is generated by Conflict Recovery Manager) before Sync Event Queue retries this event.

Embodiments of the sync event collapsing system can include the following features in some embodiments:
1. Make the name conflicts recovery behave correctly.
2. Make the failure recovery behave correctly.

In some embodiments this may require that the system should only do the collapsing if it is necessary. For example, the system should not collapse two edit events.

Examples of Collapsing Rules:

In some embodiments, recovery of the following example failure scenarios may need collapsing:
1. Name conflicts: For all the events that failed because of the name conflicts on the opposite file system, use a rename event after the original event when retrying the failed event. For those events, collapse to the original one.
   a. Create(x), Rename(x, y)->Create(y) (Collapse to original);
   b. Rename(x, y), Rename(x, z)->Rename(x, z) (Collapse to original);
   c. Move(q.x, r.x), Rename(r.x, r.y)->Move(q.x, r.y) (Collapse to original);
2. Item does not exist on the source filesystem during execution: For these events, sync client usually has a delete event after the failed event when we retry the failed event.
   a. Create(x), Delete(x)->NoOp (Discard both);
   b. Rename(x), Delete(x)->Delete(x) (Discard original);
   c. Edit(x), Delete(x)->Delete(x) (Discard original);
   d. Move(q.x, r.x), Delete(r.x)->Delete(x) (Discard original);
3. Item has been changed when delete the item on the opposite file system: For those, events, use a create event to restore the deleted item on the source file system.
   a. Delete(x), Create(x)->NoOp (Discard both);

An example pseudo code for collapsing sync events is provided below.

```
def __try_collapsing_sync_event(self, original_sync_event):
    #Go through the later events associated with the same sync item
    until a successful collapse
        sync_events - __item_id_to_sync_events get_list
    (original_sync_event item_id)
        for sync_event in copy.copy (sync_events):
            if sync_event.event_state != SyncEventState IN_PROCESS
                and
original_sync_event.seq_no <sync_event. sef_no:
                if successfully collapse original_sync_event and
sync_event:
                    break
```

2. Local Event Monitoring Refactor

The present disclosure also includes technology for local event monitoring refactor by a sync client of a cloud-based platform.

The local event monitoring can be either in, for example, the listening or full scan mode in some embodiments. In the listening mode, the system receives events for items that are changing on the filesystem. On Mac OS-based clients, the OS can notify the sync client about directories that have changes. The sync client can re-scan the directories to manufacture or generate the events. On Windows OS-based clients, for example, the OS gives the sync clients the actual or real events except for moves and renames which are reported as delete+create events.

In the full scan mode, the system can compare the state of the filesystem with the Last Sync Item Store (LSIS) to manufacture or generate events for the changes that have occurred. The raw events that are generated by the listener/full scanner can be fed into a filter pipeline that normalizes the stream of raw events and produces sync events that then the rest of the system can apply on the other filesystem in some embodiments. Because of the difference in the way the events are generated on each platform (for example the delete+create for moves), the filter pipeline configuration can vary based on the platform.

With the above described state, there are two implementations of full scan and both operate with different sets of data. Each implementation can manufacture a different set of events, bug duplication, code duplication, etc. The events can also be different across different platforms. This can have cascading effects—e.g. the filter pipeline may be different. The event generator on a MAC platform has the filesystem information but on Windows platform it does not and so it may be necessary to have one filter to collect the filesystem information and add it to the raw events (which can introduces race condition because the item may have changed). Accordingly, some embodiments refactor the Local Event Monitor so that the system only has one full scanner implementation. Some embodiments always use full scan mode for all platforms.

In the listening mode, example embodiments use a third party library called Watchdog. Some embodiments merge the two full scanner implementations with the system in one of two ways—

1. remove the existing full scanner and use the Watchdog, or
2. remove the Watchdog and implement the system's own full scanner.

FIG. 1 illustrates an example diagram of an environment suitable for operating a system implementing any of the disclosed technologies. As shown in FIG. 1, a host server 100 of a cloud-based service, collaboration and/or cloud storage platform ("cloud-based platform") can incrementally update remote sync clients (e.g., clients 110, 120, 130, 140, 160, 170) at devices 102 with events that occurred via the platform hosted by the server 100. Similarly, the devices 102 can update a sync server 122 and/or the host server 100 of the cloud-based platform with events that occurred locally on the devices via the sync clients (e.g., clients 110, 120, 130, 140, 160, 170) on the devices.

The client devices 102 can be any system and/or device, and/or any combination of devices/systems that is able to establish a communication or a connection, including wired, wireless, cellular connections with another device, a server and/or other systems such as host server 100, the sync server 122 and/or a notification server 150. Client devices 102 typically include a display and/or other output functionalities to present information and data exchanged between among the devices 102, the notification server 150, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and/or the notification server 150 (e.g., a server hosting application 120) are coupled via a network 106. In some embodiments, the devices 102 and host server 100 and/or notification server 150 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 125 for an enterprise or an organization that the users belong, and can provide an user interface 104 for the users to access such platform under the settings 125.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
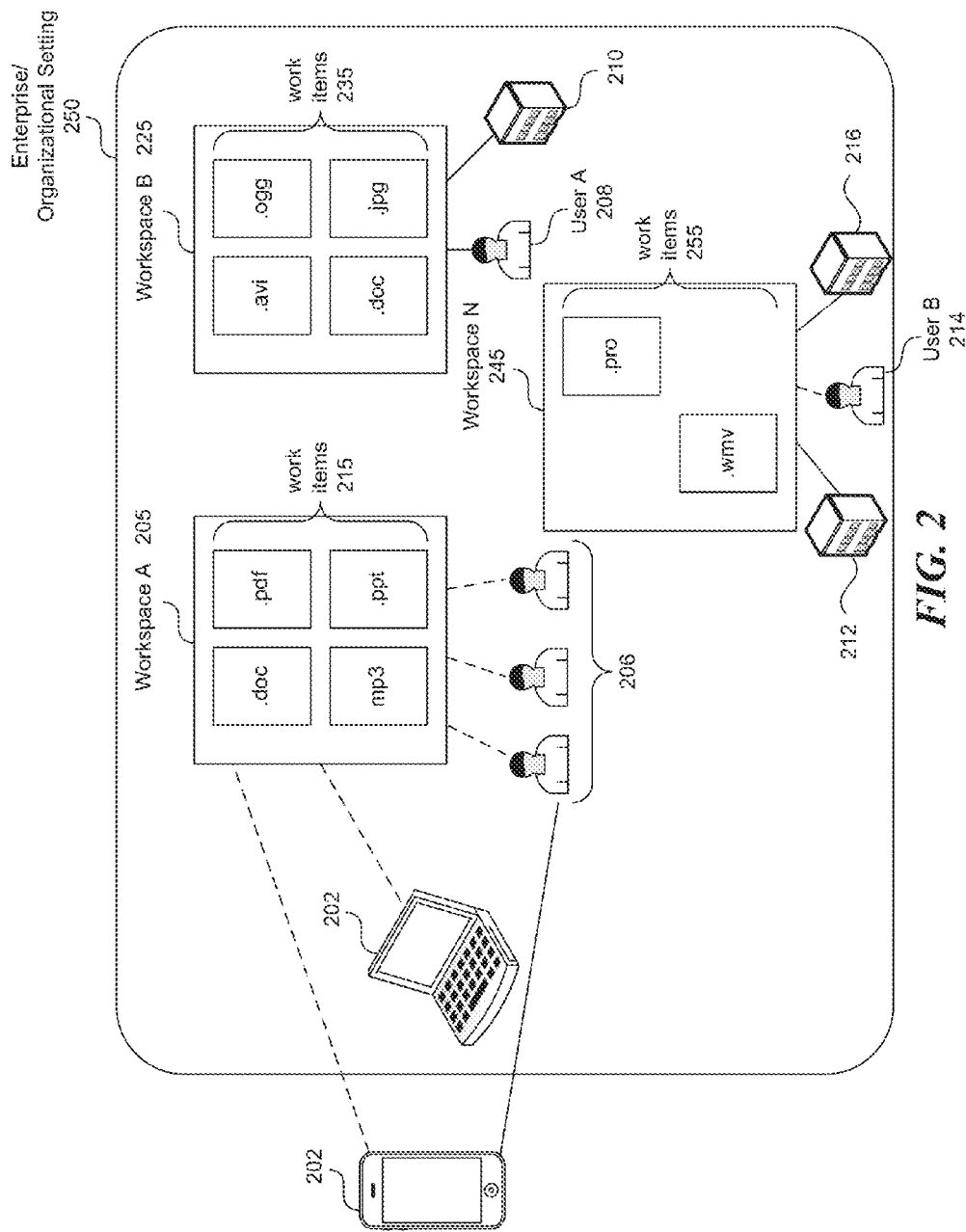
FIG. 2 depicts an example diagram of a web-based or online collaboration platform deployed in an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3A.

Embodiments of the present disclosure provide event building, collapsing, or monitoring by a synchronization component (e.g., sync client or a sync server) of a cloud-based platform hosted by the host server 100.

In general, multiple users collaborate in the cloud-based environment hosted by server 100, and the user devices 102 of these users need to be appropriately updated such that the most current versions of data/content are synchronized with the relevant user devices and that notification of events are sent to the relevant devices/users in a timely and orderly fashion. Any given user can utilize any number and types of clients (e.g., synchronization client, real time web client, mobile synchronization client, mobile application, email client, server synchronization client, etc.) at any given time. Thus, the host server 100 and the remote synchronization clients 110-170 described herein together can implement the disclosed techniques in facilitating the orderly synchronizing or updating of the remote clients 110-170 which a given user/collaborator may use to access the cloud platform via any number of user devices 102.

In general, when a user action takes place, the user action is processed (e.g., as described in FIGS. 4A-4B below) to become a plurality of event entries each corresponding to a collaborator 175, and each event entry can be read by a remote client of the collaborator to reflect the user action.

Various embodiments of the synchronization client (e.g., client 110) can ensure the correctness of the synchronized tree and other synchronized items (e.g., folders or files) completely independent from the order in which the client receives events from the action log framework ("ALF") system. In other words, so long as the ALF system correctly delivers all events to the synchronization client, the synchronization client can end up in the correct final state.

More implementation details regarding the synchronization clients 110-170, the host server 100, the repository 130, distributed data cluster 180, and various techniques in implementing event building, collapsing and monitoring by a sync client and/or a sync server are discussed below.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3A:
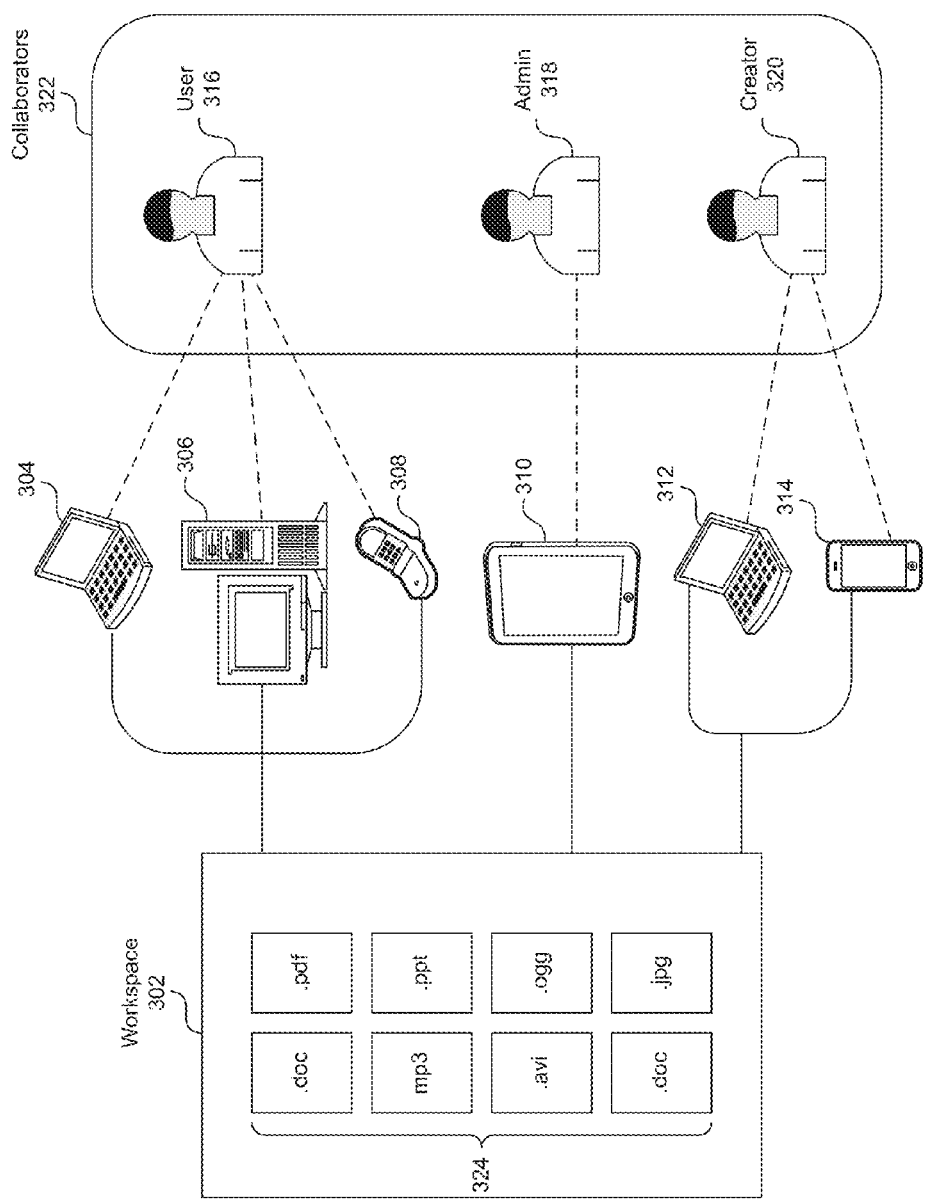
FIG. 3A depicts an example diagram of a workspace in a cloud-based platform such as an online or web-based collaboration environment accessible by multiple collaborators through various devices.

FIG. 3A depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 3B:
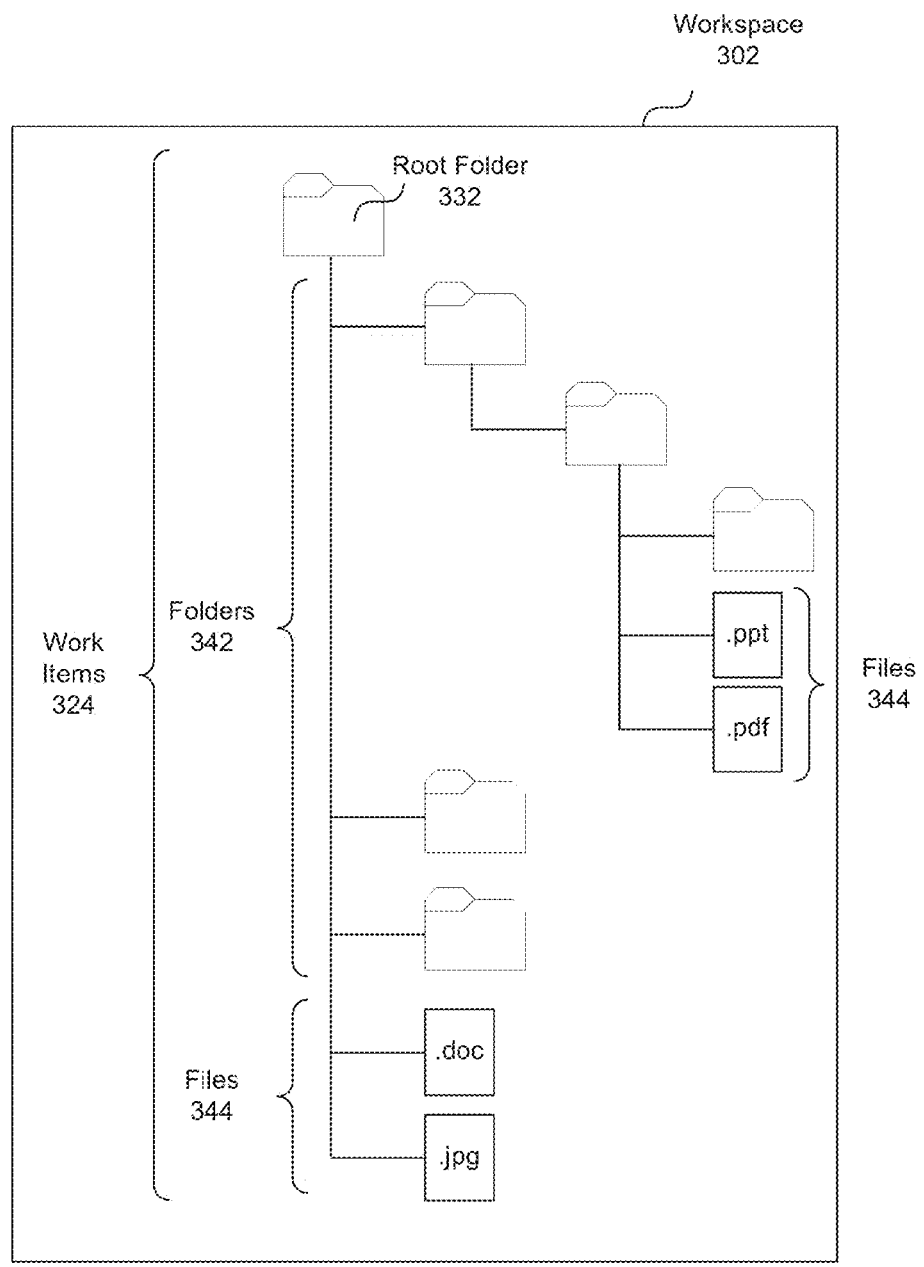
FIG. 3B depicts an abstract diagram illustrating an example data structure of the folders and files in the workspace of FIG. 3A.

FIG. 3B depicts an abstract diagram illustrating an example data structure of the folders and files in the workspace 302 of FIG. 3A. As illustrated in FIG. 3B, work items 324 of FIG. 3A can be further organized into groups using one or more folders 342 within workspace 302. The folders 342 can have more than one levels of hierarchy including, for example, parent/ascendant folder(s), child/descendant folder(s) or subfolder(s), and/or sibling folder(s). A person having ordinary skill in the art will understand that terminologies describing the hierarchy of the folders are used in a relative sense. For example, a parent folder can be a child folder of a grandparent folder, a particular child folder can be a parent folder of a grandchild folder, and so on. It is noted that the illustration of the folders are merely exemplary; depending on the embodiments, there can be more than one level of hierarchy between the illustrated folders.

Further, in some of the present embodiments, the synchronization state of a folder can be: (i) synchronized, (ii) partially synchronized, or (iii) unsynchronized. For purposes of discussion herein, a folder is synchronized when all items (e.g., folders and files) under the folder are synchronized. Likewise, a folder is unsynchronized when all items (e.g., folders and files) under the folder are unsynchronized. A folder is partially synchronized when it is neither synchronized nor unsynchronized.

Figure 4A:
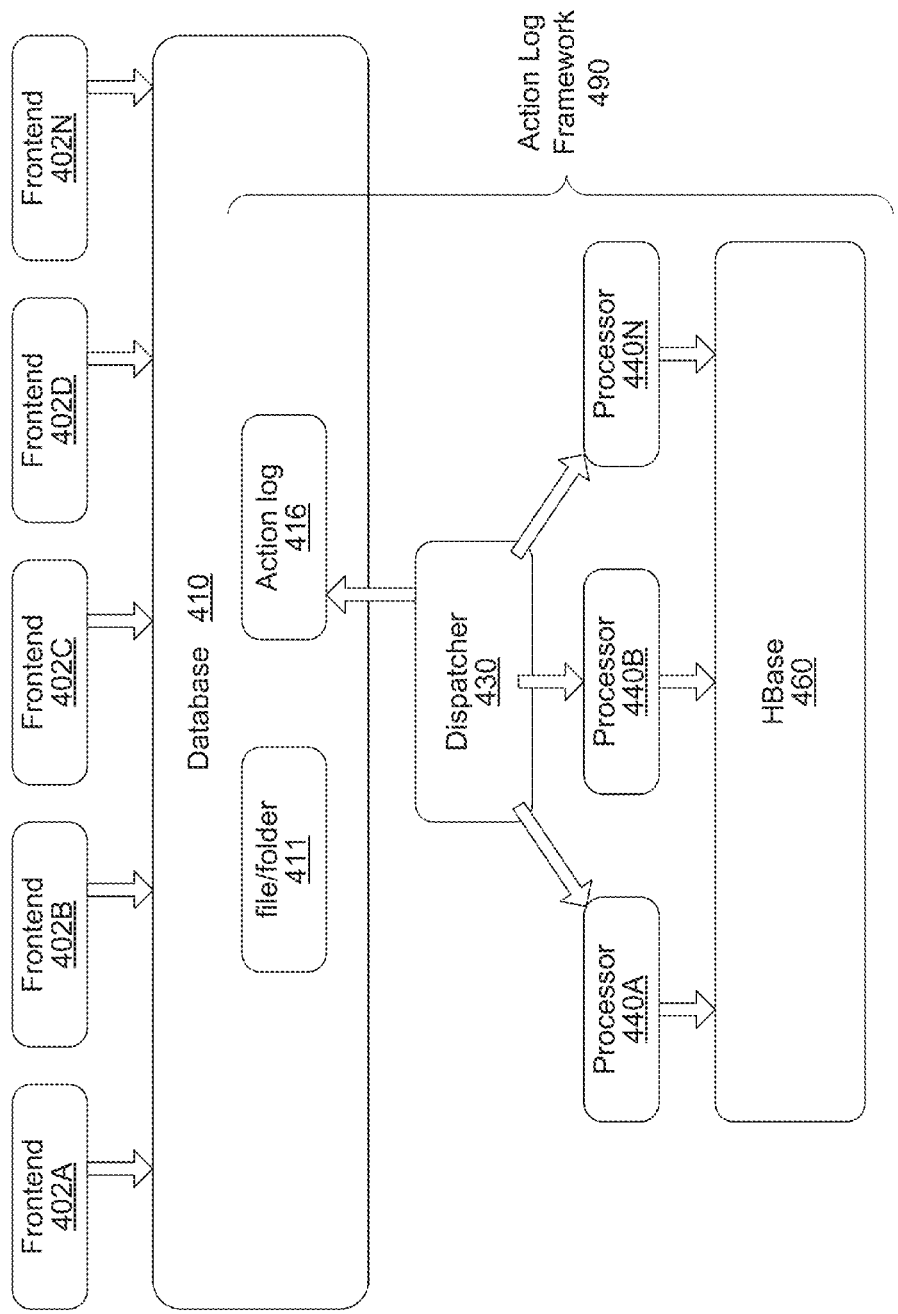
FIG. 4A depicts an example system block diagram showing the interaction between server-side components for incrementally updating a remote client with events or actions that occurred via a cloud-based platform.

FIG. 4A depicts an example system block diagram showing the interaction between server-side components for incrementally updating a remote client with events or actions that occurred via a cloud-based platform.

The server-side includes front end components 402A-N, a database 410, a dispatcher 430, one or more processors 440A-N, and a second database (e.g., HBase 460). The front end components 402A-N can interface with client devices/end user devices to detect/identify actions or transactions or events. The data or file change that occur as a result of the event is effectuated in the database 410 of the cloud-based platform (e.g., the relevant changes are made in the file table 411 of the database).

Depending on the type of action or event, an action log entry can be created and stored in the action log table or action log 416. In general, the front end 402 determines whether an action log entry is created from a given action or transaction. In general, an action log entry can be created for an action or event if certain durability requirements are to be met. The dispatcher 430 reads the action log entries from the action log 416 and sends them to the processors 440A-N where the fan-out, or collaborators to be notified of the event or to receive the file/data change as a result of the event is determined. Based on the computed fan-out or identified collaborators, the processors 440A-N writes the events/transactions to the relevant queues in the second database 460, from which remote clients can read.

It is noted also that the action log 416, the dispatcher 430, the processors 440A-N, the HBase 460, and one or more real time clients 470A-N (see FIG. 4B) are generally referred to as an "action log framework (ALF) 490." More specifically, HBase 460 is a primary data repository of the ALF 490. User actions initiated (e.g., via the web application or the API) result in rows (or action log entries) being written to the action log 416 (or action log table 416). Then, in some embodiments, the action log entries are read from action log 416 by the ALF dispatcher 430, de-normalized into separate entries per user that needs to be notified of the action by an ALF processor (e.g., processor 440A), and written to the HBase 460. The HBase 460 is in turn read (e.g., via an API web service call) by real time clients 470A-N to notify a collaborator of the new change.

Figure 4B:
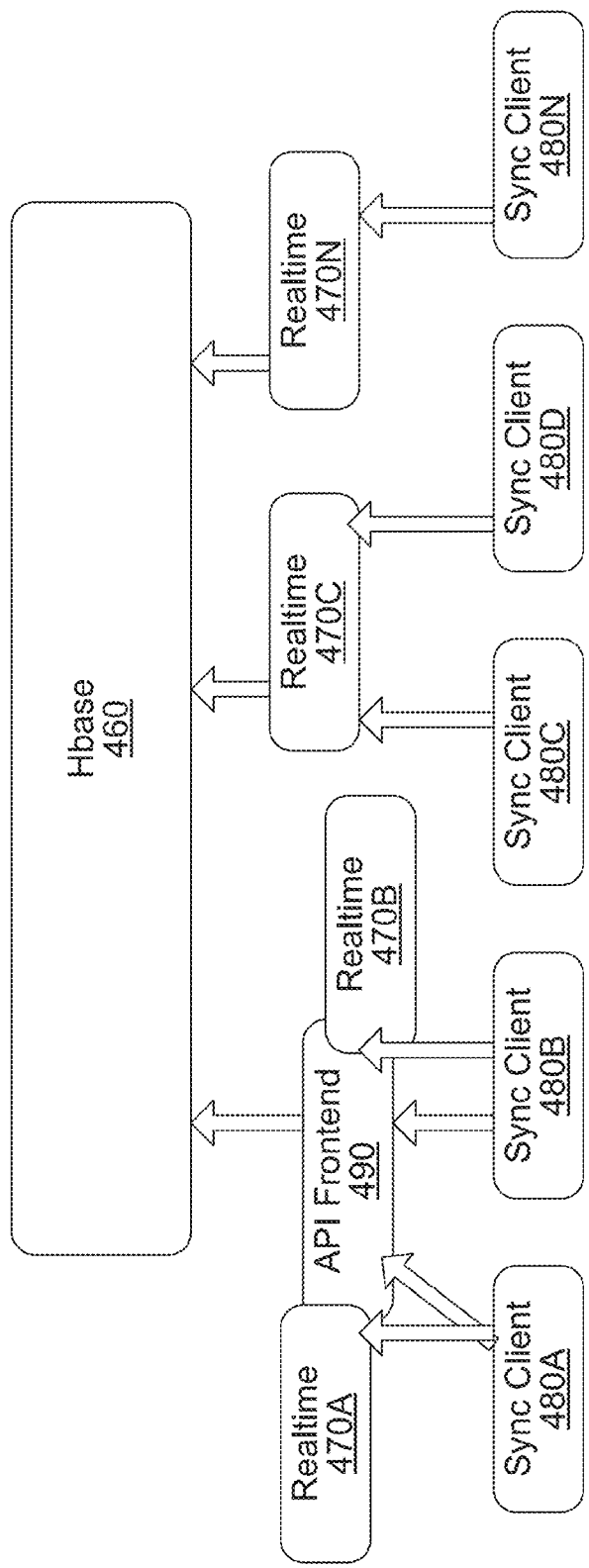
FIG. 4B depicts an example block diagram showing the interaction of remote clients and with a distributed database cluster for incremental updates of events/actions which occurred at a cloud-based environment.

FIG. 4B depicts an example block diagram showing the interaction of remote clients 470A-N and 480A-N with a distributed database cluster 460 for incremental updates of events/actions which occurred at a cloud-based environment. The remote clients can include, for example real time clients 470A-N(e.g., real-time web clients launched via a web browser, mobile application), and synchronization clients 480A-N(e.g., desktop synchronization, mobile synchronization, server synchronization, etc.) that users or collaborators use to interface/access the cloud-based platform including, but not limited to, a collaboration environment. Other types of clients may also read from the database cluster 460.

The queues in the database 460 (e.g., the distributed database cluster) are usually client type specific. For example, each queue is for a given client type for one given user. So, a user 'A' may have a synchronization client queue that all of the synchronization clients that user "A" uses reads from since user "A" may have multiple devices on which synchronization clients are installed. In general, the queues for clients in the database 460 are read only queues such that multiple clients can read from the same queue without making modifications. In this manner, if a user utilizes multiple synchronization clients, each client can still receive and detect the respective updates such that multiple devices can be synchronized. The remote clients also typically individually track the location in the queue from which they last read such that only the most recent events are updated at the client, and that the events read from a queue is specific to a given client, dependent on what has previously been synchronized or read.

In one embodiment, synchronization clients 480 connect to both real-time 470 and API front end 490 machines. The real time machines 470 can notify a synchronization client 480 when there has been an update in a user's account. The synchronization client 480 can then connect to API front end machine 490 to obtain the actual change/content. Alternatively, in some instances, the synchronization clients 480 can also obtain the changes/content/updates from the real time machines 470 simultaneous with the notification, or after being notified.

Figure 5:
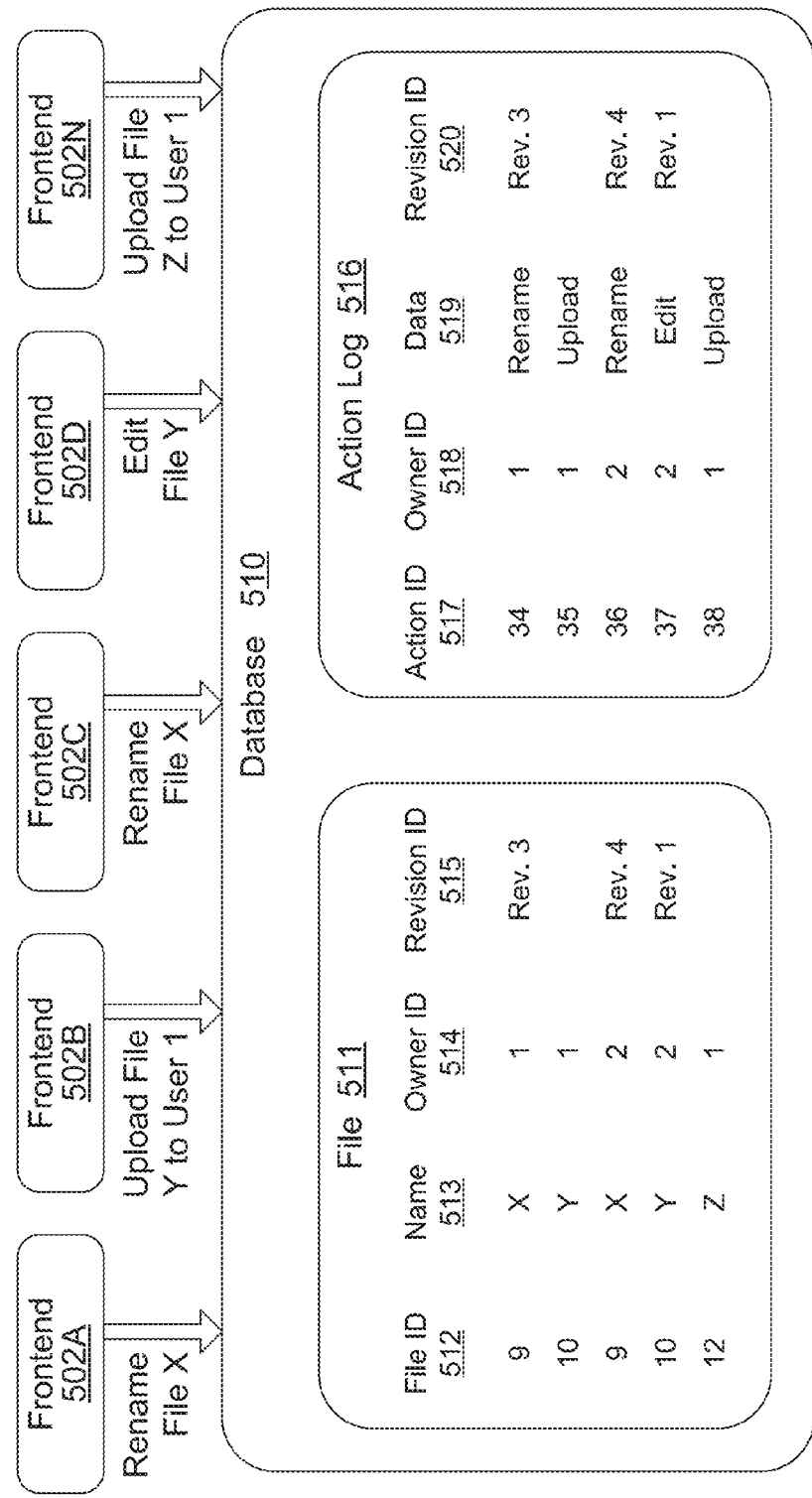
FIG. 5 depicts an example system block diagram showing action log entries recorded from actions/interactions on or with files/content stored in a database of a cloud-based environment.

FIG. 5 depicts an example system block diagram showing action log entries 516 recorded from actions/interactions on or with files/content 511 stored in a database 510 of a cloud-based environment.

The front ends 502A-N detect, identify, or receive the various actions or events on data or content performed by users or collaborators in a cloud-based environment. For example, events/actions can include by way of example but not limitation, file renames, file uploads/downloads, file edits, comments, etc. Based on the type of event, the front end 502 determines whether the action/event is to be created into a log entry to be stored in the action log 516. In creating a log entry, each action/event is recorded as a transaction with the file system change for asynchronous processing. In recording the transaction, the relevant file/folder row in the file 511 of the database 510 is inserted, updated, deleted, or otherwise modified according to the action. In one embodiment, the row is inserted in to the action log table 516 simultaneously with the write to the file 511 and also with the performance of action itself. Note that each entry includes an owner ID 514 in the file 511 and in the action log 516 to represent the owner of the item upon which an action occurred.

In one embodiment, action log entries are created in the same database 510 as the file table 511 such that file/content rollback can be performed if the file/data/content change results in an error or failure. As such, the action log entry creation in the action log table 516 can be created, in part, to meet durability (e.g., longevity) requirements of a given event/transaction (e.g., write events, or other edit events typically have higher durability requirements than a comment event, or a share event, etc.).

Action log entries can be created for select types of events or all events. For example, events/transactions such as file renames, file uploads may have higher durability requirements than a comment event, or a share event, in a sense that the changes from a file rename/file upload need to be maintained and updated at various respective clients for the relevant collaborators and the implication for missing a file rename or file upload is potentially more severe than missing a comment event or a share event, etc.

In general, action log entries are generally created for actions/events with higher durability requirements. Such a determination can be made by the front ends 502 as to whether a given event type is to be writing into the action log table 516. Action log entries may also be created for all events with durability requirements carried out downstream at event queues stored in the second database (e.g., the database 460 of FIG. 4B). Table 516 shows the action log entries created from the events stored in the file table 511.

The action log entries can be identified by the action ID 517. In addition, each action log entry can be associated with a user (e.g., owner) identifier 518, a data entry 519, and/or a revision identifier 520. The user identifier 518 can identify a user who is to a recipient as a result of an event (e.g., upload file to User 1). The owner identifier 518 represents the owner of the item upon which an action (e.g., represented by action ID 517) occurred and in general, each work item has no more than one owner. The data field 519 can identify the type of action/event (e.g., rename, upload, edit, comment, share, send, download, etc.).

The revision identifier 520 can indicate the version of any change made to a given file (e.g., edit, rename, upload, etc.). In one embodiment, the revision identifier 520 is derived from version tracking mechanisms (e.g., via revision ID 515) inherent to the database 510. The revision identifier 520 can be used by remote clients to resolve conflicts in view of potentially conflicting events/transactions. For example, if a file is re-named twice and both events are synchronized/updated at a remote client, the client can use the rename event associated with the latest revision ID to make the necessary updates. This can ensure that the client is updated with the most current change regardless of when the events are read from the queue. Thus, even if the two rename events are writing to the queue for the client out of order, the client can still make the 'correct' update using the revision ID in case of conflicting changes.

Figure 6:
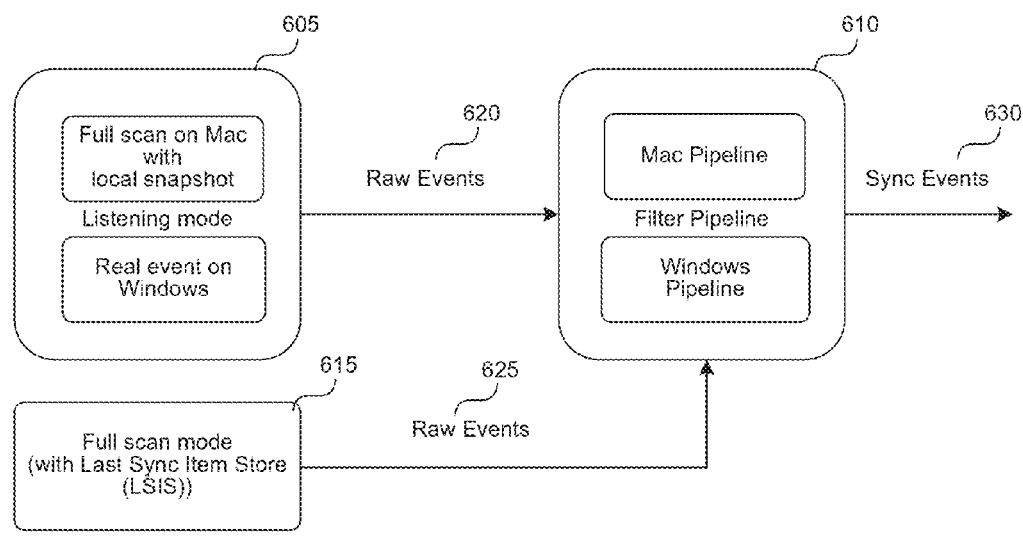
FIG. 6 depicts a diagram illustrating local event monitoring in a first embodiment of the synchronization client of the cloud-based platform.

FIG. 6 depicts a diagram illustrating local event monitoring in some embodiments of the sync client of the cloud-based platform. As illustrated, the local event monitoring can operate in two modes, the listening mode 605 and the full scan mode 615. In the listening mode 605, the local event monitor receives events for items that are changing on the filesystem. On Mac OS-based clients, the OS can notify the sync client about directories that have changes. The sync client can then re-scan the directories to manufacture the events. On Windows OS-based clients, for example, the OS gives the sync clients the actual or real events except for moves and renames which are reported as delete+create events.

In the full scan mode 615, the local event monitor can compare the state of the filesystem with the Last Sync Item Store (LSIS) to manufacture or generate events for the changes that have occurred. The raw events 620/625 that are generated by the listener or the full scanner can be fed into a filter pipeline that normalizes the stream of raw events and produces sync events that the rest of the system can apply on the opposite filesystem in some embodiments. Because of the difference in the way the events are generated on each platform (for example the delete+create for moves), the filter pipeline configuration can vary based on the platform (e.g., Windows, Mac).

With the above described state, there are in effect two implementations of full scan and both operate with different sets of data. Each implementation can manufacture a different set of events, bug duplication, code duplication, etc. The events can also be different across different platforms. This can have cascading effects—e.g. the filter pipeline may be different. The event generator on a Mac platform has the filesystem information but on Windows platform it does not and so it may be necessary to have one filter to collect the filesystem information and add it to the raw events (which can introduce race condition because the item may have changed). Accordingly, some embodiments refactor the Local Event Monitor so that only one full scanner is implemented (i.e., the listening mode 605 or the full scan mode 615). Other embodiments can use the full scan mode 615 for all platforms. For example, in some embodiments, a watchdog (used by the listening mode) can be used and the full scanner can be removed. Alternately, the watchdog can be removed and the full scanner can be implemented.

Figure 7:
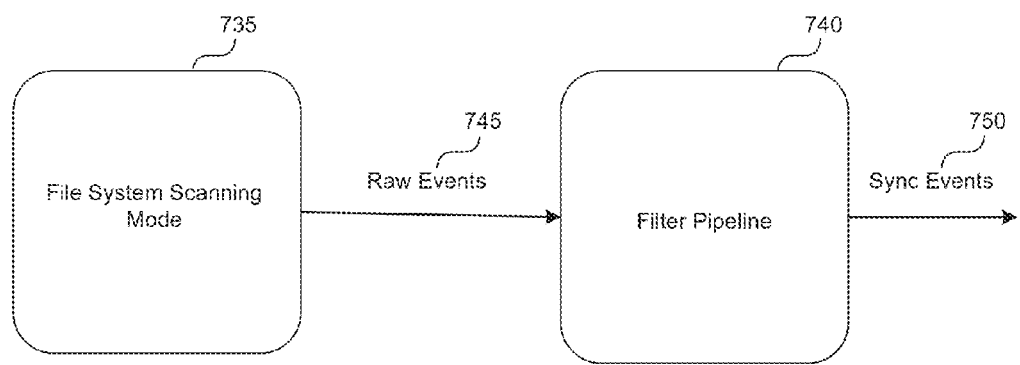
FIG. 7 depicts a diagram illustrating local event monitoring in a second embodiment of the synchronization client of the cloud-based platform.

FIG. 7 depicts a diagram illustrating local event monitoring in some embodiments of the sync client of the cloud-based platform. The event monitoring as described with respect to FIG. 6 is refactored to maximize code maintainability through encapsulation and reuse of common methods and data structures across the local file system and the remote file system at the cloud-based platform server. The listen and full scan modes described with respect to FIG. 6 are collapsed into one full scan mode implemented by the file system scanning mode 735, thereby removing duplication of full scan logic between the sync client and the watchdog.

On the local file system, the file system scanning mode 735, as part of the event monitoring process, turns file system notifications about files or folders that have changed from file system observers into raw events 745 by determining item changes and ordering the item changes. On the cloud-based platform, the file system scanning mode 735 listens to the ALF stream, which can directly provide a list of files or folders that have changed or notifications about the files or folders that have changed, determines item changes and orders the item changes to produce raw events 745 that are then processed by the filter pipeline 740 into sync events 750 suitable for execution on the opposing file system.

Figure 8A:
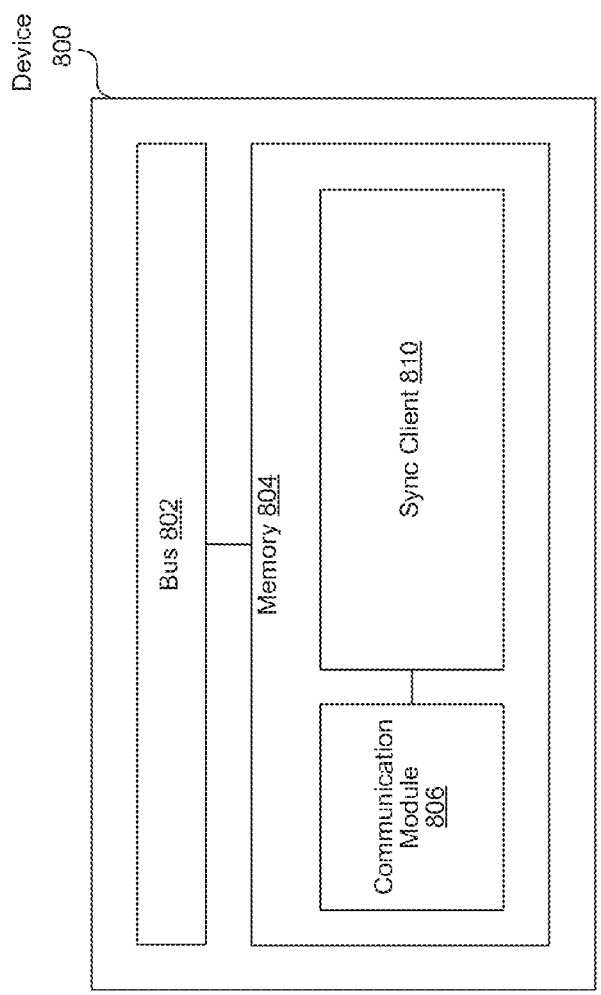
FIG. 8A depicts a block diagram illustrating example components of a device having a synchronization client of the cloud-based platform for synchronization event building using a single mode and/or synchronization event collapsing.

FIG. 8A depicts a block diagram illustrating example components of a device 800 (e.g., devices 102 in FIG. 1) having a sync client 810 of the cloud-based platform for sync event building using a single mode and/or sync event collapsing.

The device 800 can include, for example, a bus 802, and a memory 804 among other components. The memory 804 can include, among others, a sync client 810 and a communication module 806. The communication module 806 facilitates communication among the device 800, the host server 100, and other components discussed herein (e.g., the ALF system 490) using any of the communication protocols that are supported. The memory 804 may also include other device modules (not shown in FIG. 8A for simplicity) such as a GPS module for determining and providing location information, text input module for accepting and processing inputs provided using different input mechanisms of the mobile device, and the like for handling various functions of the device 800. It is noted that the aforementioned modules are intended for purposes of enabling the present embodiments, rather than limiting. As such, a person of ordinary skill in the art will understand that the present disclosure covers apparent alternatives, modifications, and equivalents (e.g., combining or separating the modules) made to the techniques described herein. Additional or less components/modules/engines can be included in the device 800 and each illustrated component.

As used herein, a "module," "a manager," an "interface," "observer," "builder," "scanner," "pipeline," "filter," "detector," "generator," "re-orderer," or an "engine" includes a general purpose, dedicated or shared processor and, typically, firmware or software modules that are executed by the processor. Depending upon implementation-specific or other considerations, the module, manager, interface, or engine can be centralized or its functionality distributed. The module, manager, interface, observer, builder, scanner, pipeline, filter, detector, generator, re-orderer or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. §101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The bus 802 is a subsystem for transferring data between the components of the mobile device 800. For example, the bus 802 facilitates the transfer of data between the memory 804 and other components of the device 800 such as the processor and/or the input/output components that utilize the data.

Figure 8B:
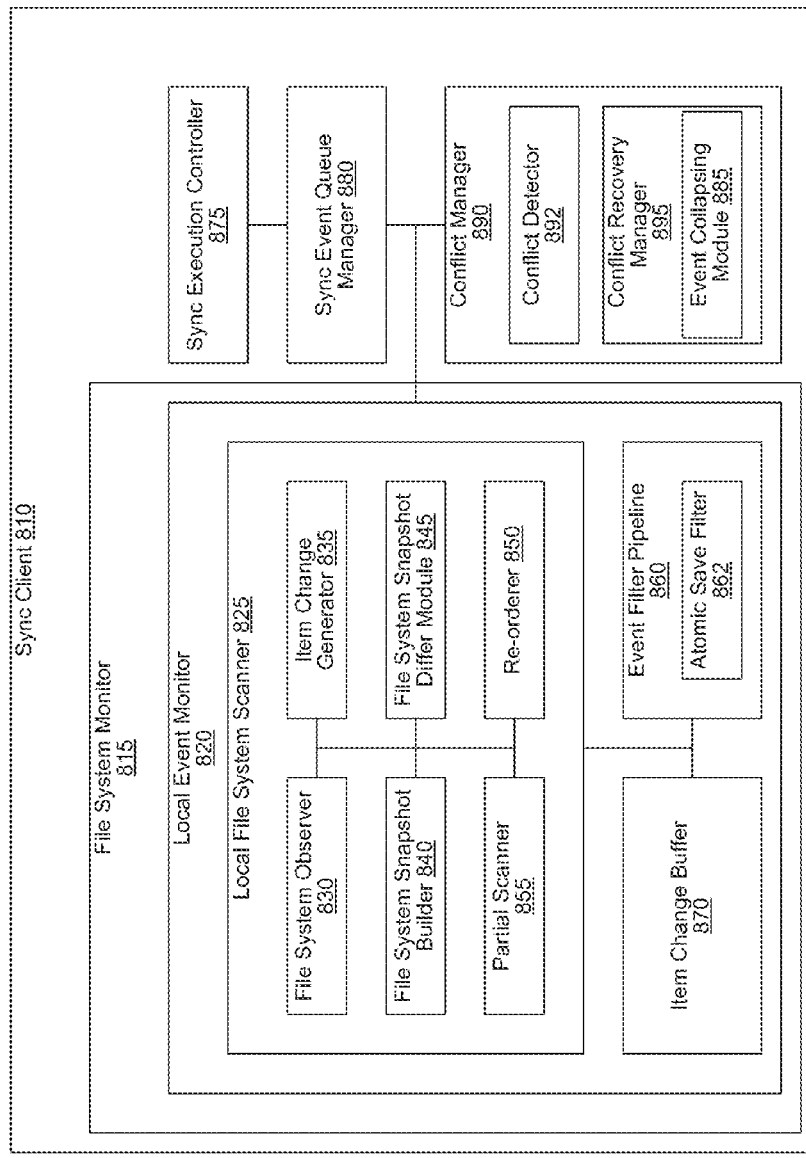
FIG. 8B depicts a block diagram illustrating example components of the synchronization client of FIG. 8A.

Example components of the sync client 810 are illustrated in the block diagram of FIG. 8B. In some embodiments, the sync client 810 can include a local event monitor 820 (or raw event processor) having a local file system scanner 825 including a partial scanner 855, a file system observer 830, an item change generator 835, a file system snapshot builder 840, a file system snapshot differ module 845 and a re-orderer 850, among others. The local event monitor 820 can also include an event filter pipeline 860 having an atomic save filter 862 and an item change buffer 870. The sync client can also include a sync execution controller 875, a sync event queue manager 880 and a conflict manager 890 having a conflict detector 892 and a conflict recovery manager 895 having an event collapsing module 885. Other embodiments may include more or less components.

In one embodiment of the present disclosure, during normal operations, the sync client 780 can operate in a single mode. The file system observers 830 can generate file system notifications when a file or folder changes on the local file system. The file system notifications can include information about the changed file or folder (i.e., dirty file or folder). Generally, the file system observer 830 provides notifications about dirty folders. The local event monitor 825 then triggers the partial scanner 855 to perform a partial scan of the local file system to obtain the full set of dirty items.

In some embodiments, the partial scanner 855 performs partial scanning of the affected or dirty folder by leverage the item change generator 835. The item change generator 835 generates a consistent snapshot (e.g., via the file system snapshot builder 840) and compares the consistent snapshot with a reference snapshot to generate differences between the two snapshots (e.g., file system snapshot differ 845). In other words, the item change generator 835 can determine item changes based on a consistent snapshot of a folder whose children have changed and a reference snapshot of the folder in response to the file system notifications. The partial scanner 855 then updates the reference snapshot by applying the new (consistent) snapshot on top. In some embodiments, a snapshot can be built or generated by walking or traversing the directory (or dirty folder tree) and recording all entries. If there are no dirty folders added to the queue for a settle time (e.g., 100 ms), the snapshot is called consistent. If there is a new file system notification, a snapshot is built for that notification, and a new snapshot is built by merging the snapshot for the dirty folder on top of the original snapshot. In some embodiments, the differences between a reference snapshot and the current snapshot are obtained by the file system snapshot differ 845. The reference snapshot can pertain to the last known state of the dirty folder. It should be noted that for the first run, the reference snapshot is built from the persisted LSIS. Via the partial scanning process, the differences between the reference and current snapshots can be determined by generating a list of all item ids that are in the reference snapshot and in the domain of the current snapshot. The process loops through all elements in the current snapshot and obtains item changes for everything that has a different item state in the reference snapshot. All the observed items are then removed from the all item id list. The process then yields item changes with delete set to true for all items remaining in the all item id list. The process then updates the reference snapshot by applying the new snapshot on top of it.

In some embodiments, the re-orderer 850 can detect inter-item event dependencies and re-order the changes as necessary before feeding the item changes to the filter pipeline 860. The re-orderer 850 can reorder items by checking each change against a snapshot of the monitored filesystem to see if the new state brought about by the change is consistent with the rest of the filesystem. If it is, the change is passed on to the event filter pipeline 860 and the snapshot is updated to reflect the change. Otherwise, the change is buffered (e.g., in the item change buffer 870) until another item change alters the snapshot in such a way as to make the buffered change consistent. If an item change remains buffered for longer than a filesystem specific timeout, which can be configurable in some embodiments, then it is assumed that either a change has been missed by the filesystem scanner or the filesystem scanner has returned corrupt changes. In such instances, a notification can be generated for error handling, the change can be dropped, or other process can be initiated to resolve the inconsistency. In one example embodiment, the re-orderer 850 can perform a number of checks to determine if the change is consistent with the existing snapshot.

For example, if the change is for a deleted folder, the re-orderer 850 can check the snapshot to see that the folder does not contain any children. If the change is for a non-deleted item, the re-orderer 850 can check the snapshot to see that the parent folder of the item exists and that no other item with the same name exists in the parent folder. If the change represents a move, the re-orderer 850 can check the snapshot to see that the item is not an ancestor of its new parent. In some embodiments, the re-orderer 850 can also detect and handle circular renames by manufacturing an item change for one of the items that moves the item to a temporary location.

Raw events are produced by the local file system scanner by ordering the item changes and producing a set of executable actions like create, delete, etc. The raw events are processed by the event filter pipeline 860 into sync events that can be executed directly on the opposite file system (i.e., the cloud-based platform file system). In some embodiments, processing the raw events into sync events include translating the file system identifiers of items to logical identifiers so that the events can be executed directly on the opposite file system. An atomic save filter 862 can maintain the mapping between the logical identifiers and the underlying file system identifiers. The mapping and translation of file system identifiers into logical identifiers is needed as the raw events refer to the file system identifier, rather than the logical identifier and on the local file system, the file system identifier of an item can change while the item remains logically the same. The sync events describe executable actions like create, delete, etc., and the sync client is committed to at least attempting to execute the sync events as the sync events are produced in an order that can be consistently applied to the opposite file system.

Some embodiments of the sync client 810 include a sync event queue manager 880 that places sync events on a sync event queue for serialized execution. The sync execution controller 875 gets the next event to execute from the sync event queue. The execution controller 875 can have a list based or priority based implementation. For example, in the list based implementation, the next event candidate is checked against the items that are in progress and if the item already has an in progress sync event, the next event candidate is skipped. In the priority based implementation, unprocessed events are managed in a priority queue of sync event containers. A sync event container is a set of all unprocessed sync events for a given item, weighted by the lowest weight sync event in the container. When one sync event from this sync event container is executed, then all sync events for that item are no longer in the priority queue and so the remaining sync events in the sync event container will not be executed on subsequent get_next_sync_event( ) calls. When the in-process sync event is completed, it is removed from the sync event container which is returned back into the priority queue if not empty.

Some embodiments of the sync client 810 include a conflict manager 890. The conflict manager, via the conflict detector 892, can identify when a sync has failed or when a conflict has occurred (e.g., a file or work item/folder has been changed at both the server sync folder and the local sync folder) which caused the sync to fail. A sync event can fail for various reasons which may be conflict related or unrelated. Example failure reasons that are related to conflict include, but are not limited to: item not found, item name in use, item name not valid, item name too long, item locked, version mismatch, or the like. Other failure reasons can include, for example, communication failure (e.g., network goes down), authentication failure (e.g., auth token expired), quota failure, or the like. Some of these sync failures are local to a particular sync event (e.g., item not found is local to a sync event relating to the item) while others are global (e.g., communication failure can impact all sync events). The conflict detector 892 can in general detect sync failures that are conflict related or unrelated.

The conflict manager 890 includes a conflict recovery manager 895 to determine how to resolve the conflict, resolve the conflict using the determined strategy and try to sync again when one or more retry conditions are met. The conflict recovery manager 895 can include several conflict resolvers to resolve various conflict cases. The conflict recovery manager 895 selects a conflict resolver that is mapped to the event type, file system and/or failure reason triple to resolve a conflict related to a sync event. A conflict resolver resolves the conflict by calling a rules engine to determine what action to take to resolve the conflict. When the specified action or actions is taken, the file system is restored back to its consistent state.

In some embodiments, one example conflict resolver includes an event collapsing module 885. The event collapsing module 885 can collapse a failed event into a later event to successfully execute the original event. When the conflict detector 892 detects name conflict as the failure reason for a sync event, the event collapsing module 885 can use a later rename event to collapse into the original event before retrying the failed event. Similarly, when the conflict detector 892 detects as the item not found on the source filesystem during execution as a reason for failure of a sync event, the event collapsing module 885 collapses a later delete event into the failed event before retrying the failed event. By way of another example, when the conflict detector 892 detects an item change when deleting the item on the opposite file system as a reason for failure of a sync event, the event collapsing module 885 collapses a later create event into the failed event before retrying the failed event. After collapsing a failed event into a later or subsequent event, the resulting event is placed in the sync event queue 980 for execution.

Figure 9:
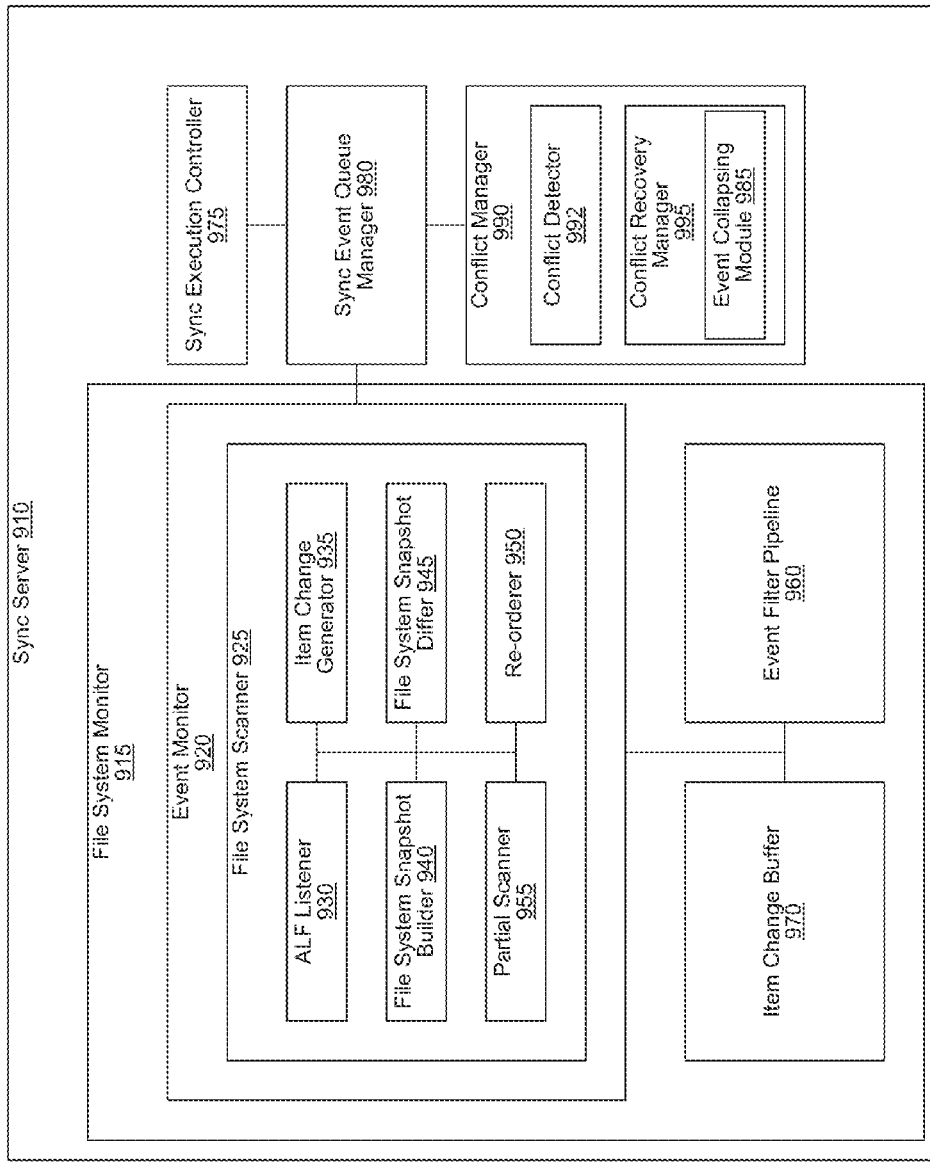
FIG. 9 depicts a block diagram illustrating example components of a synchronization server of a cloud-based platform for synchronization event building using a single mode and/or synchronization event collapsing.

FIG. 9 depicts example components of a sync server 910 of a cloud-based platform. The sync server 910, in some embodiments, includes many of the same components as the sync client 810 described in FIG. 8B for sync event building and event collapsing. For example, the sync server 910 can include a file system monitor 915 having an event monitor 920 and an event filter pipeline 960. The event monitor 920 can include a file system scanner 925 having an ALF listener 930, an item generator 935, a file system snapshot builder 940, a file system snapshot differ 945, a partial scanner 955 and a re-orderer 950. The sync server 910 can also include a sync execution controller 975, a sync event queue manager 980 and a conflict manager 990 having a conflict detector 992 and a conflict recovery manager 995. The conflict recovery manager 995 can include an event collapsing module 985.

The ALF listener 930, in some embodiments, can detect ALF events. The ALF events can include information about a new item state and minimal information about the type of change that occurred on an item. In some embodiments, the ALF listener 930, by listening to ALF stream, can directly obtain items that have been changed and their new states.

Alternatively, the ALF listener 930 can obtain notifications that specific folders are recursively dirty. The partial scanner 955 can then be invoked to scan the affected folders to obtain the items that have been changed. The partial scanner 955 employs a method substantially similar to the method employed by the partial scanner 855 to generate differences between a reference snapshot and a current snapshot to obtain item changes and update the reference snapshot by applying the new snapshot on top of it. In some embodiments, the file system snapshot builder 940 of the sync server 910 can use an application programming interface (API) call to obtain an account tree and using the account tree data obtained as a response to generate a consistent snapshot of a folder that has been changed (or is dirty).

In some embodiments, the file system identifier of an item on the cloud-based platform is suitable for use as a logical identifier for the item. This enables the event filter pipeline 960 to generate sync events from raw events without requiring a translation between the logical identifiers and the file system identifiers.

Figure 10A:
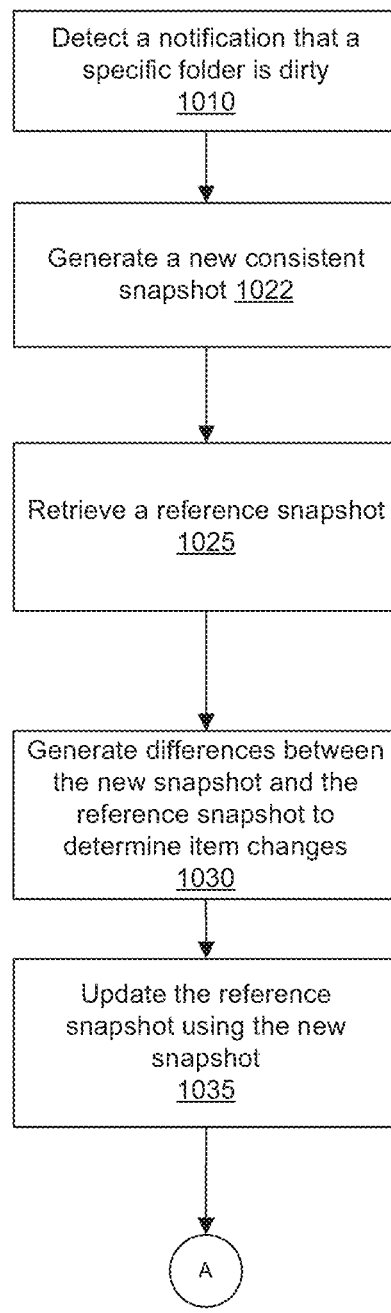
FIG. 10A depicts a logic flow diagram illustrating an example method of generating item changes for synchronization event building

FIG. 10A depicts a logic flow diagram illustrating an example method of generating item changes for sync event building. The example method includes a sync component (e.g., sync client, sync server) detecting a notification that a specific folder is dirty (i.e., the folder has been changed in the workspace) at block 1010. In some embodiments, the sync server receives the notification from the ALF stream. In some embodiments, instead of the notification, the sync server can receive a set of dirty items and their new states representing a current snapshot. In some embodiments, the sync client can receive the notification from a file system observer. Upon receiving the notification, the sync component can perform a partial scan of the affected folder. Performing a partial scan can include generating a new consistent snapshot of the affected folder at block 1022. The new consistent snapshot of the affected folder can include a list of dirty items and their new states. In some embodiments, the sync server can generate a consistent snapshot using an API call such as a transaction GAT request which returns a set of dirty items. In some embodiments, the sync client can generate a consistent snapshot by traversing through the dirty folder and recording all the entries to obtain a set of dirty items and their new states.

At block 1025, the sync component retrieves a reference snapshot of the dirty folder. The reference snapshot inside a file system scanner stores the last known states of the dirty items. At block 1030, the sync component generates differences between the reference snapshot and the new snapshot to determine item changes. In some embodiments, generating the differences between the two snapshots includes generating a list of all item identifiers that are in the reference snapshot ("all item ID list"). The sync component then processes each item identifier in the new snapshot to determine item changes for all item identifiers in the new snap shot that have a different item state in the reference snapshot. All the item identifiers that have been observed or evaluated are then removed from the all item ID list. The sync client further determines item changes with delete set to true for all item identifiers remaining in the all item ID list. At block 1035, the sync client updates the reference snapshot using the new snapshot. In some embodiments, the reference snapshot is updated using not only the changes detected from the partial scan but also from any changes made by sync executors on the monitored file system.

Figure 10B:
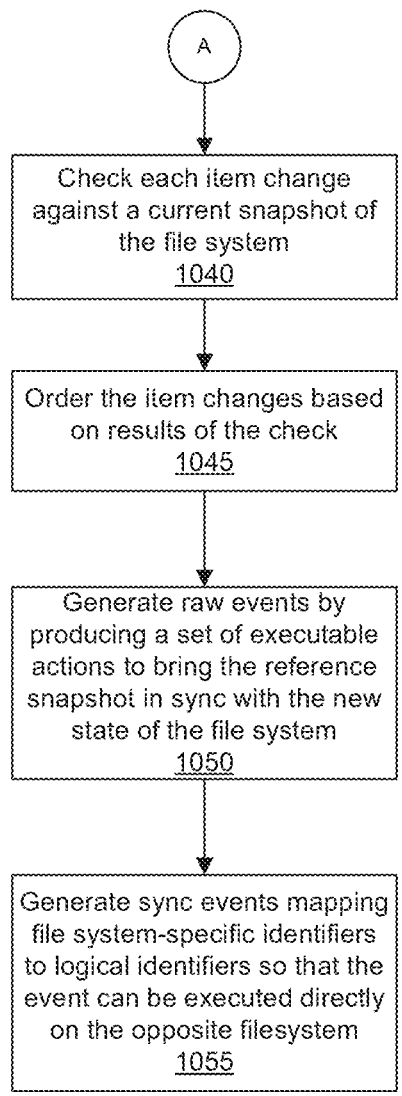
FIG. 10B depicts a logic flow diagram illustrating item change ordering and raw event generation for synchronization event building

FIG. 10B depicts a logic flow diagram illustrating item change ordering and raw event generation for sync event building. Once the item changes have been determined and the reference snapshot is updated, the sync component can check each item change against a current snapshot of the file system to determine an order in which item changes should be applied at block 1040. For example, if the change is for a deleted folder, the snapshot can be checked to see that the folder does not contain any children. If the change is for a non-deleted item, the snapshot can be checked to see that the parent folder of the item exists and that no other item with the same name exists in the parent folder. If the change represents a move, the snapshot can be checked to see that the item is not an ancestor of its new parent. Like the filesystem snapshot described in FIG. 10A, the filesystem snapshot for ordering item changes can also include changes made by the sync executor and the file system scanner. At block 1045, based on the results of the check against the current snapshot of the filesystem, the sync component orders the item changes so that the item changes are consistent with the existing snapshot. In some embodiments, item changes that are not consistent with the existing snapshot are buffered until another item change alters the snapshot of the filesystem. At block 1050, the sync component generates raw events by using the ordered item changes to produce a set of executable actions. At block 1055, the sync component generates sync events by mapping file system identifiers to logical identifiers to enable syncing between the local file system and the remote file system.

Some embodiments of the present disclosure include a method of building synchronization events by a synchronization component associated with a cloud-based platform. The method can obtain a set of items that have been changed and new states of the set of items and retrieve last known states of the set of items. The last known states of the set of items are stored in a reference snapshot inside a filesystem scanner. The method can generate differences between the new states and the last known states of the set of items as item changes and utilize information provided by the item changes to translate the item changes into synchronization events.

The synchronization component can receive a notification of a change in a folder (e.g., the file system observer 830) and in response scan the folder to obtain the set of items that have been changed (e.g., partial scanner 855, item change generator 835). In some implementations, event dependencies between the item changes can be detected and the item changes can be ordered based on the detected event dependencies to allow the new state brought about by applying each item change is consistent with a filesystem (e.g., re-orderer 850). In some implementations, the synchronization component (e.g., re-orderer 850) can check each item change against a snapshot of a filesystem monitored by the synchronization component to determine if the new state brought about by the item change is consistent with the filesystem. If the new state brought about by the item change is not consistent with the filesystem, the synchronization component (e.g., item change buffer 870) can buffer the item change until another item change alters the snapshot of the filesystem. Similarly, if the new state brought about by the item change is consistent with the filesystem, the synchronization component can provide the item change to a filter pipeline (e.g., filter pipeline 860) for generating the synchronization events. In some implementations, the synchronization events include actions arranged in a predetermined order for execution on an opposing file system and the predetermined order allows the synchronization events to be executed without generating any inconsistencies. The synchronization component can be one of a synchronization client on a device or a synchronization server remote from the device and each can have an associated filesystem.

Some embodiments of the present disclosure includes a method of generating synchronization events associated with a synchronization component of a cloud-based platform. The method includes detecting that a folder on a filesystem has been changed, generating a new snapshot of the filesystem that is consistent, retrieving a reference snapshot of the filesystem, generating item changes by differencing the new snapshot from the reference snapshot and using the item changes to generate the synchronization events for execution on an opposing file system. The method can also include updating the reference snapshot using the new snapshot. In some implementations, the method includes checking each item change against a current snapshot of the filesystem to determine an order for executing the item changes and generating raw events in the determined order as executable actions to be applied to the opposing filesystem without generating inconsistencies. In some implementations, the method includes processing the raw events to generate the synchronization events for execution. Processing the raw events can include translating file system identifiers of items associated with the item changes to logical identifiers. In some implementations, differencing the new snapshot from the reference snapshot can further comprise generating a list of all item identifiers that are in the reference snapshot, processing each item in the new snapshot to obtain item changes for items that have different item states in the reference snapshot, removing all items involved in the processing from the list and obtaining item changes with delete set to true for all items remaining in the list.

Figure 11:
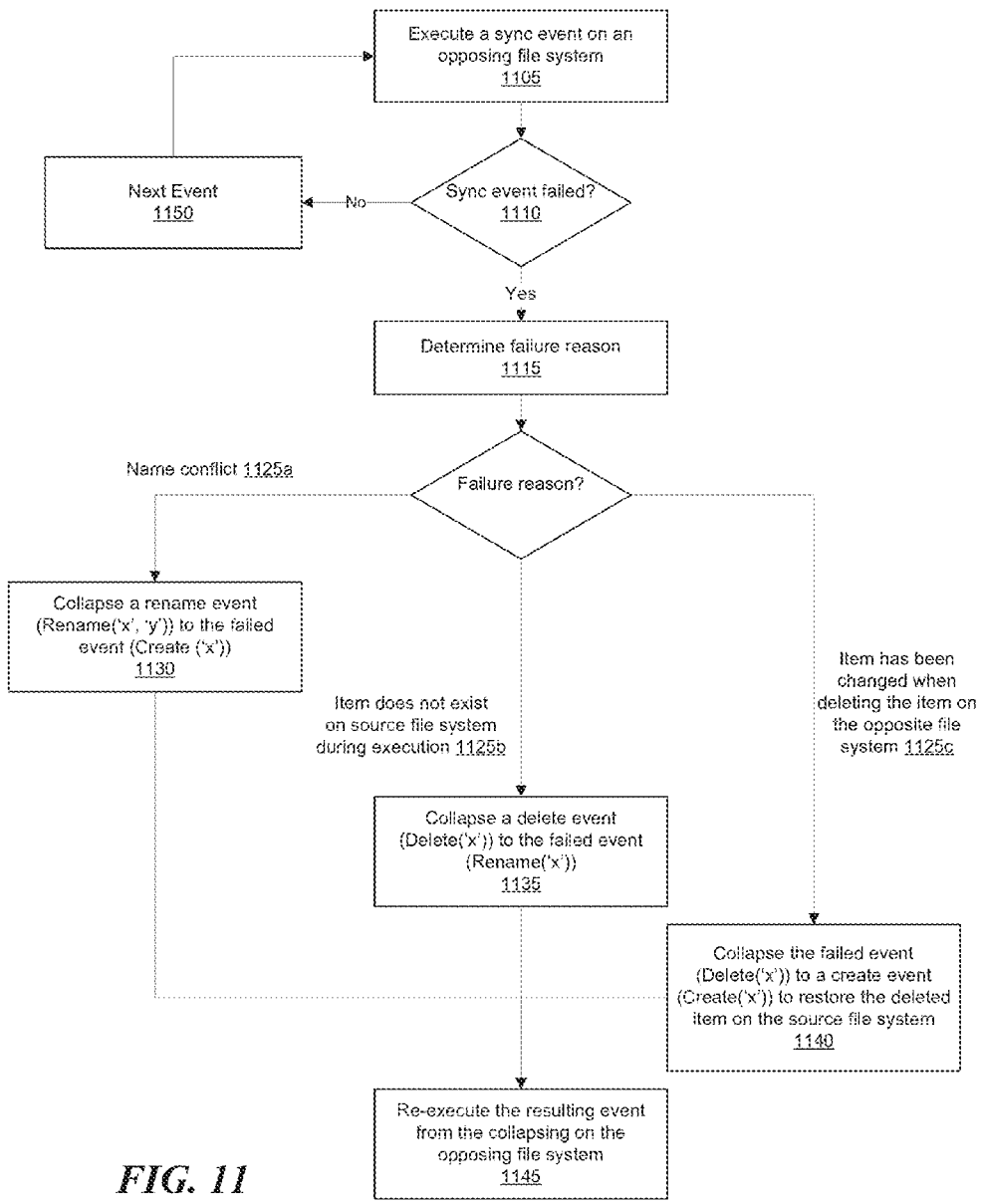
FIG. 11 depicts a logic flow diagram illustrating an example method of collapsing a failed event into a subsequent event to handle synchronization event failures.

FIG. 11 depicts a logic flow diagram illustrating an example method of collapsing a failed event into a subsequent event to handle sync event failures. The method starts at block 1105, when the sync component (e.g., a sync client or a sync server) attempts to execute a sync event on an opposite file system. At decision block 1110, if the sync event fails, the sync component can detect the failure event and determine a failure reason at block 1115. If the sync event is a success, the next sync event 1150 in the sync event queue is executed. In some embodiments, the failure reason can be a name conflict 1125a. In the event of a name conflict, the sync component can wait for a subsequent rename event and collapse the rename event into the failed event at block 1130. Collapsing the failed event into the rename event creates a new or resulting event that can then be re-executed by the sync component on the opposite file system at block 1145. In some embodiments, the failure reason can be that the item does not exist on source file system during execution 1125b. In this scenario, the sync component can wait for a subsequent delete event and collapse the delete event into the failed event at block 1135 and re-execute the resulting event at the opposing file system at block 1145. In some other embodiments, the failure reason can be that the item has been changed when deleting the item on the opposite file system 1125c. In this scenario, the sync component can collapse the failed event into a subsequent create event to restore the deleted item on the source file system and re-execute the resulting event on the opposing file system at block 1145.

Some embodiments of the present disclosure include a method of handling failed synchronization events by a synchronization component of a cloud-based platform. The method includes detecting a failed synchronization event associated with a synchronization item, identifying a subsequent synchronization event associated with the synchronization item to collapse with the failed synchronization event and re-executing the collapsed synchronization event on an opposing file system. In some implementations, the method can include determining a failure reason associated with the failed synchronization event and identifying the subsequent synchronization event based on the failure reason. In some implementations, when the failure reason includes name conflict, the subsequent synchronization event includes a rename event. Similarly, when the failure reason includes missing synchronization item on a source filesystem, the subsequent synchronization event includes a delete event. In some implementations, when the failure reason includes change in the synchronization item when deleting the synchronization item on the opposing file system, the subsequent synchronization event includes a create event. In some implementations, collapsing the subsequent synchronization event with the failed synchronization event can result in a single operation or no operation. The single operation can include a create operation, a rename operation, a move operation or a delete operation.

Figure 12:
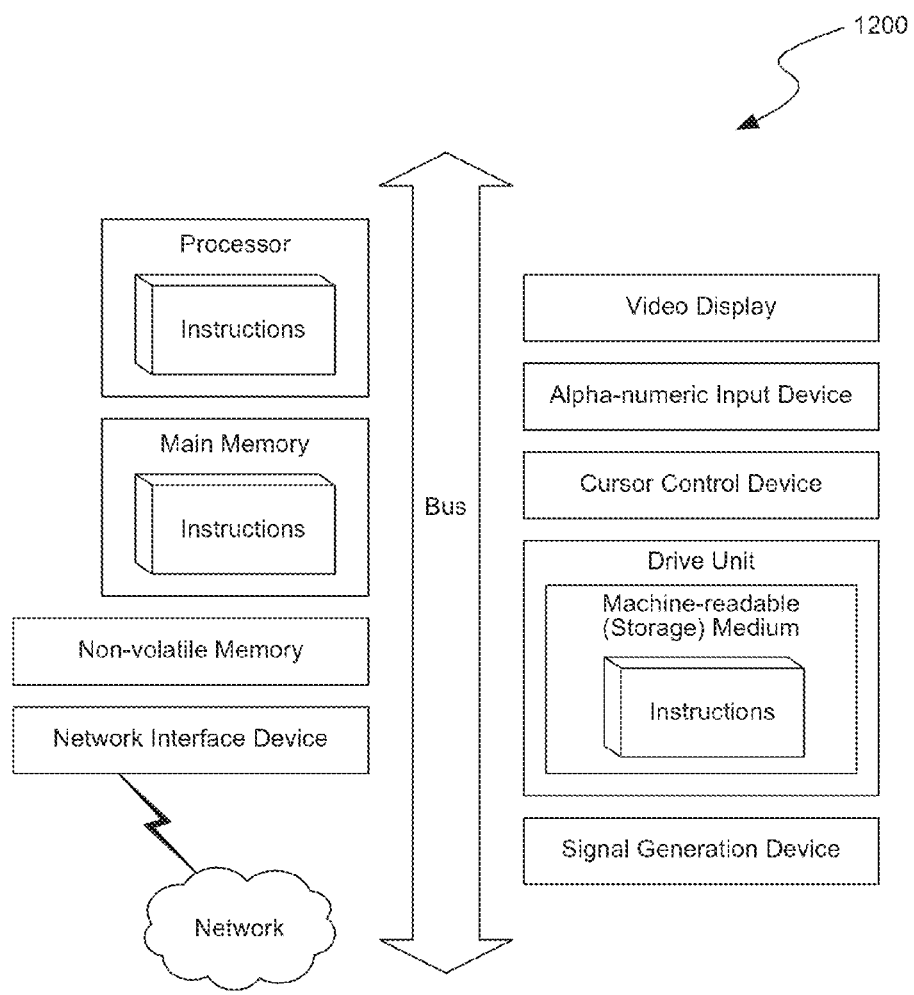
FIG. 12 depicts a diagrammatic representation of a machine in the example form of a computer system within which a set of instructions, for causing the machine to perform any one or more of the methodologies discussed herein, can be executed.

FIG. 12 shows a diagrammatic representation 1200 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1200 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects can likewise be embodied as a means-plus-function claim, or in other forms, such as being embodied in a computer-readable medium. (Any claim intended to be treated under 35 U.S.C. §112, ¶6 begins with the words "means for".) Accordingly, the applicant reserves the right to add additional claims after filing the application to pursue such additional claim forms for other aspects of the disclosure.

What is claimed is:

1. A method of building synchronization events by a synchronization component associated with a cloud-based platform, the method comprising:
    obtaining, at a client device, a set of items that have been changed and new states of the set of items;
    retrieving last known states of the set of items, wherein the last known states of the set of items are stored in a reference snapshot inside a filesystem scanner;
    generating differences between the new states and the last known states of the set of items as item changes;
    utilizing information provided by the item changes to translate the item changes into synchronization events, wherein a filter pipeline included in the synchronization component generates the synchronization event; and
    upon determining, at the client device, that the synchronization component lacks access to filesystem Information,
        collecting the filesystem information and
        adding the file system information into the filter pipeline for generating the synchronization events.

2. The method of claim 1, further comprising receiving a notification of a change in a folder and in response scanning the folder to obtain the set of items that have been changed.

3. The method of claim 1, further comprising:
    detecting event dependencies between the item changes;
    ordering the item changes based on the detected event dependencies to allow the new state brought about by applying each item change is consistent with a filesystem.

4. The method of claim 1, further comprising:
    checking each item change against a snapshot of a filesystem monitored by the synchronization component to determine if the new state brought about by the item change is consistent with the filesystem.

5. The method of claim 4, further comprising:
    if the new state brought about by the item change is not consistent with the filesystem, buffering the item change until another item change alters the snapshot of the filesystem.

6. The method of claim 4, further comprising:
    if the new state brought about by the item change is consistent with the filesystem, providing the item change to the filter pipeline for generating the synchronization events.

7. The method of claim 1, wherein the synchronization events include actions arranged in a predetermined order for execution on an opposing file system, wherein the predetermined order allows the synchronization events to be executed without generating any inconsistencies.

8. The method of claim 1, wherein the synchronization component is one of a synchronization client on a device or a synchronization server remote from the device, each associated with a respective filesystem.

9. A method of generating synchronization events associated with a synchronization component of a cloud-based platform, the method comprising:
    detecting that a folder on a filesystem has been changed;
    generating a new snapshot of the filesystem that is consistent;
    retrieving a reference snapshot of the filesystem;
    generating item changes by differencing the new snapshot from the reference snapshot;

using the item changes to generate the synchronization events for execution on an opposing file system, wherein a filter pipeline included in the synchronization component generates the synchronization event; and upon determining that the synchronization component lacks access to filesystem information:
collecting the filesystem information and
adding the filesystem information into the filter pipline for generating the synchronization events.

10. The method of claim 9, further comprising:
updating the reference snapshot using the new snapshot.

11. The method of claim 9, further comprising:
checking each item change against a current snapshot of the filesystem to determine an order for executing the item changes.

12. The method of claim 11, further comprising:
generating raw events in the determined order as executable actions to be applied to the opposing filesystem without generating inconsistencies.

13. The method of claim 12, further comprising:
processing the raw events to generate the synchronization events for execution.

14. The method of claim 13, wherein processing the raw events includes translating file system identifiers of items associated with the item changes to logical identifiers.

15. The method of claim 9, wherein differencing the new snapshot from the reference snapshot further comprises:
generating a list of all item identifiers that are in the reference snapshot;
processing each item in the new snapshot to obtain item changes for items that have different item states in the reference snapshot;
removing all items involved in the processing from the list; and
obtaining item changes with delete set to true for all items remaining in the list.

16. A non-transitor computer readable medium storing instructions configured to, when executed by a computing device, cause the computing device to perform a method of building synchronization events by a synchronization component associated with a cloud-based platform, the method comprising:
generating file system notifications, wherein the notifications include information about files or folders that have been changed;
determining item changes based on a consistent snapshot of a folder whose children have changed and a reference snapshot of the folder in response to the file system notifications;
generating raw events by ordering the item changes and producing a set of executable actions;
generating synchronization events by mapping file system identifiers to logical identifiers for execution on an opposing file system, wherein a filter pipeline included in the synchronization component generates the synchronization events; and
upon determining that the synchronization component lacks access to filesystem information:
collecting the filesystem information and
adding the filesystem information into the filter pipeline for generating the synchronization events.

\* \* \* \* \*